US010758084B2

(12) United States Patent
Schlosser et al.

(10) Patent No.: US 10,758,084 B2
(45) Date of Patent: *Sep. 1, 2020

(54) FUEL EFFICIENT GRILL FOR DIRECT AND INDIRECT COOKING

(71) Applicants: Erich J. Schlosser, Barrington, IL (US); James Michael Sunich, Carol Stream, IL (US); Hollice Childress, Schaumburg, IL (US); Romualdo Sonny Siazon, Woodstock, IL (US); Aman Sharma, Round Lake, IL (US)

(72) Inventors: Erich J. Schlosser, Barrington, IL (US); James Michael Sunich, Carol Stream, IL (US); Hollice Childress, Schaumburg, IL (US); Romualdo Sonny Siazon, Woodstock, IL (US); Aman Sharma, Round Lake, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/010,801

(22) Filed: Jun. 18, 2018

(65) Prior Publication Data

US 2018/0310762 A1    Nov. 1, 2018

Related U.S. Application Data

(63) Continuation of application No. 14/813,852, filed on Jul. 30, 2015, now Pat. No. 10,070,754, which is a
(Continued)

(51) Int. Cl.
*A47J 37/00* (2006.01)
*A47J 37/07* (2006.01)

(52) U.S. Cl.
CPC ................. *A47J 37/0704* (2013.01)

(58) Field of Classification Search
CPC ...... A47J 37/0786; A47J 37/067; A47J 37/07; A47J 37/0704; A47J 36/06; A47J 36/36;
(Continued)

(56) References Cited

U.S. PATENT DOCUMENTS

D201,416 S    6/1965  Sazegar
3,276,440 A   10/1966 Sazegar
(Continued)

FOREIGN PATENT DOCUMENTS

CN   201595118 U   10/2010
CN   203000600 U    6/2013
(Continued)

OTHER PUBLICATIONS

First Examination Report dated Mar. 28, 2019 issued in corresponding Indian Application No. 1177/KOL/2015.
(Continued)

*Primary Examiner* — Jason Lau
(74) *Attorney, Agent, or Firm* — Vitale, Vickrey, Niro, Solon & Gasey LLP

(57) ABSTRACT

A fuel efficient grill that permits effective direct and indirect cooking, permits movement of the fuel grate and has uniquely shaped air intake slots is provided. Also provided is a hinged deflector or diffuser plate and an adjustable top vent assembly.

4 Claims, 13 Drawing Sheets

Related U.S. Application Data continuation-in-part of application No. 14/575,227, filed on Dec. 18, 2014, now Pat. No. 10,070,755.

(58) Field of Classification Search
CPC .............. A47J 37/0694; A47J 37/0713; A47J 37/0745; F24B 1/193; F24B 13/00; F24B 1/04; F24B 1/183; F24B 7/02; F24B 1/19; F24B 1/191; F24B 1/1952; F24B 1/199; F24B 1/28; F24B 5/04; F24B 15/107

See application file for complete search history.

(56) References Cited

U.S. PATENT DOCUMENTS

| | | | |
|---|---|---|---|
| 3,568,590 | A | 3/1971 | Grice |
| 4,037,580 | A | 7/1977 | Angelo |
| 4,207,864 | A * | 6/1980 | Fischer ............... F16K 1/165 126/285 R |
| 4,302,181 | A | 11/1981 | Schlosser |
| 4,382,432 | A | 5/1983 | Lizdas |
| 4,416,248 | A | 11/1983 | Schlosser |
| 4,436,081 | A | 3/1984 | Hefling |
| 4,498,452 | A | 2/1985 | Schlosser |
| 4,576,140 | A | 3/1986 | Schlosser |
| 4,624,239 | A | 11/1986 | Yellin |
| 4,677,964 | A | 7/1987 | Lohmeyer |
| 4,924,845 | A | 5/1990 | Johnson |
| 4,941,817 | A | 6/1990 | Schlosser |
| 5,036,832 | A | 8/1991 | Schlosser |
| 5,213,075 | A | 5/1993 | Stephen |
| 5,730,114 | A | 3/1998 | Fabrikant |
| D420,243 | S | 2/2000 | Samaras |
| 6,155,248 | A | 12/2000 | Schlosser |
| D444,663 | S | 7/2001 | Samaras |
| D444,990 | S | 7/2001 | Samaras |
| 6,318,356 | B1 | 11/2001 | Stephen |
| D469,651 | S | 2/2003 | Samaras |
| 6,640,799 | B2 | 11/2003 | Kahler |
| D583,185 | S | 12/2008 | Rutter |
| D592,442 | S | 5/2009 | Rutter |
| 7,644,711 | B2 | 1/2010 | Creel |
| D615,807 | S | 5/2010 | Creel |
| D615,814 | S | 5/2010 | Creel |
| D680,372 | S | 4/2013 | Brennan |
| 2002/0195140 | A1* | 12/2002 | Heil ............... F16K 1/223 137/75 |
| 2005/0039612 | A1 | 2/2005 | Denny |
| 2005/0051157 | A1 | 3/2005 | Cuomo |
| 2009/0308373 | A1 | 12/2009 | Scott |
| 2009/0308374 | A1* | 12/2009 | Ahmed ............... A47J 37/067 126/25 R |
| 2010/0006083 | A1 | 1/2010 | Educate |
| 2010/0095946 | A1 | 4/2010 | Creel |
| 2010/0258105 | A1 | 10/2010 | Simms, II |
| 2010/0258106 | A1 | 10/2010 | Simms, II |
| 2011/0283990 | A1 | 11/2011 | Walters |
| 2013/0061765 | A1 | 3/2013 | Reinhart |
| 2013/0206015 | A1 | 8/2013 | Jacoby |
| 2013/0206850 | A1 | 8/2013 | Erickson |
| 2013/0312732 | A1 | 11/2013 | Brennan |
| 2014/0116265 | A1 | 5/2014 | Samaras |
| 2014/0137854 | A1* | 5/2014 | Roberts ............... A47J 37/0786 126/25 R |
| 2014/0165993 | A1 | 6/2014 | Ahmed |
| 2014/0224750 | A1 | 8/2014 | Vogds |
| 2014/0360385 | A1 | 12/2014 | Cammon |

FOREIGN PATENT DOCUMENTS

| | | |
|---|---|---|
| CN | 204026116 U | 12/2014 |
| DK | 200101276 A | 3/2003 |
| DK | 176696 B1 | 3/2009 |
| EP | 2241232 A2 | 10/2010 |
| KR | 20060116687 A | 11/2006 |
| KR | 20120084543 A | 7/2012 |
| KR | 20130106123 A | 9/2013 |

OTHER PUBLICATIONS

Extended European Search Report dated Dec. 16, 2019 issued in corresponding European Application No. 19201023.9.
Primo Ceramic Grills 2013 product catalog.
www.primogrill.com, Oval Beats Round Every Time, Primo's Patented Oval Design.
Kamado Joe User Guide, rev. 7/12.
www.kamadojoe.com, What Are They Thinking?!.
Big Green Egg M/S Egg and Band Assembly Instructions.
Big Green Egg XL Egg and Band Assembly Instructions.
www.biggreenegg.com, convEGGtor (Plate Setter).
Vision Grills product catalog.
Broil King KEG Operation Handbook, 911770/4000 Series.
www.dancookusa.com, Patented Technology.
Caliber Range Corporation, Thermashell Pro Charcoal Grill brochure.
www.popularmechanics.com, 5 Grills and Gadgets for a Better BBQ.
www.williams-sonoma.com, Caliber Thermashell Charcoal Grill with Cart.
www.bbqsandmore.co.nz, Caliber Thermashell Pro Charcoal Grill.
King-Griller by Char-Griller, Akorn Kamado Kooker, Owner's Manual, Model #6520.
Patent Examination Report No. 1 dated May 13, 2016 in corresponding Australian Patent Application No. 2015258224.
Extended European Search Report dated May 24, 2016 in corresponding European Application No. 15197261.9.
Extended European Search Report dated Oct. 11, 2016 in corresponding European Application No. 16178983.9.
Examination Report dated Jan. 25, 2017 issued in corresponding Australian Application No. 2016204656.
Examination Report dated Apr. 21, 2017 issued in corresponding Australian Application No. 2016225826.
Office Action and Search Report dated Oct. 16, 2017 in corresponding Chinese Application No. 201510902978.1.
Examination Report No. 1 dated May 8, 2018 issued in corresponding Australian Patent Application No. 2017202208.
Examination Report No. 1 dated Nov. 13, 2018 in corresponding Australian Application No. 2018208767.
Extended European Search Report dated Feb. 19, 2020 in corresponding European Application No. 19207368.2.

* cited by examiner

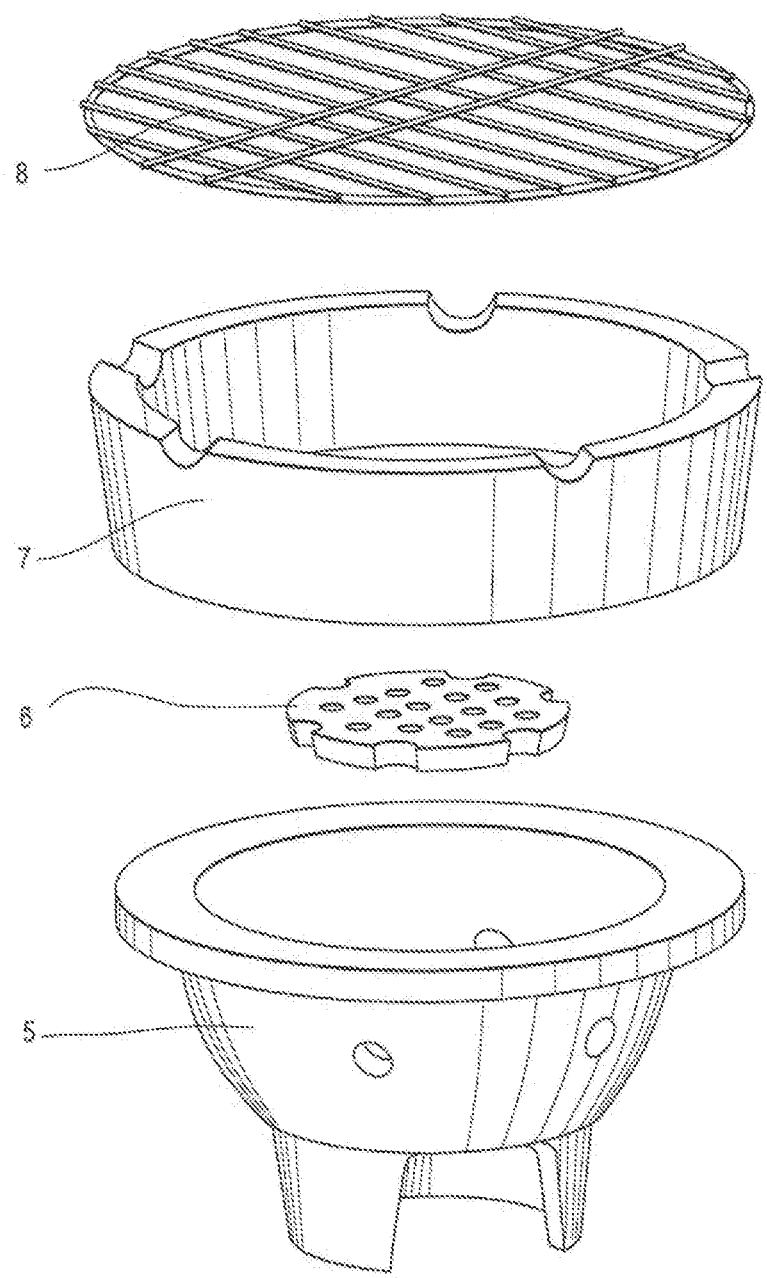

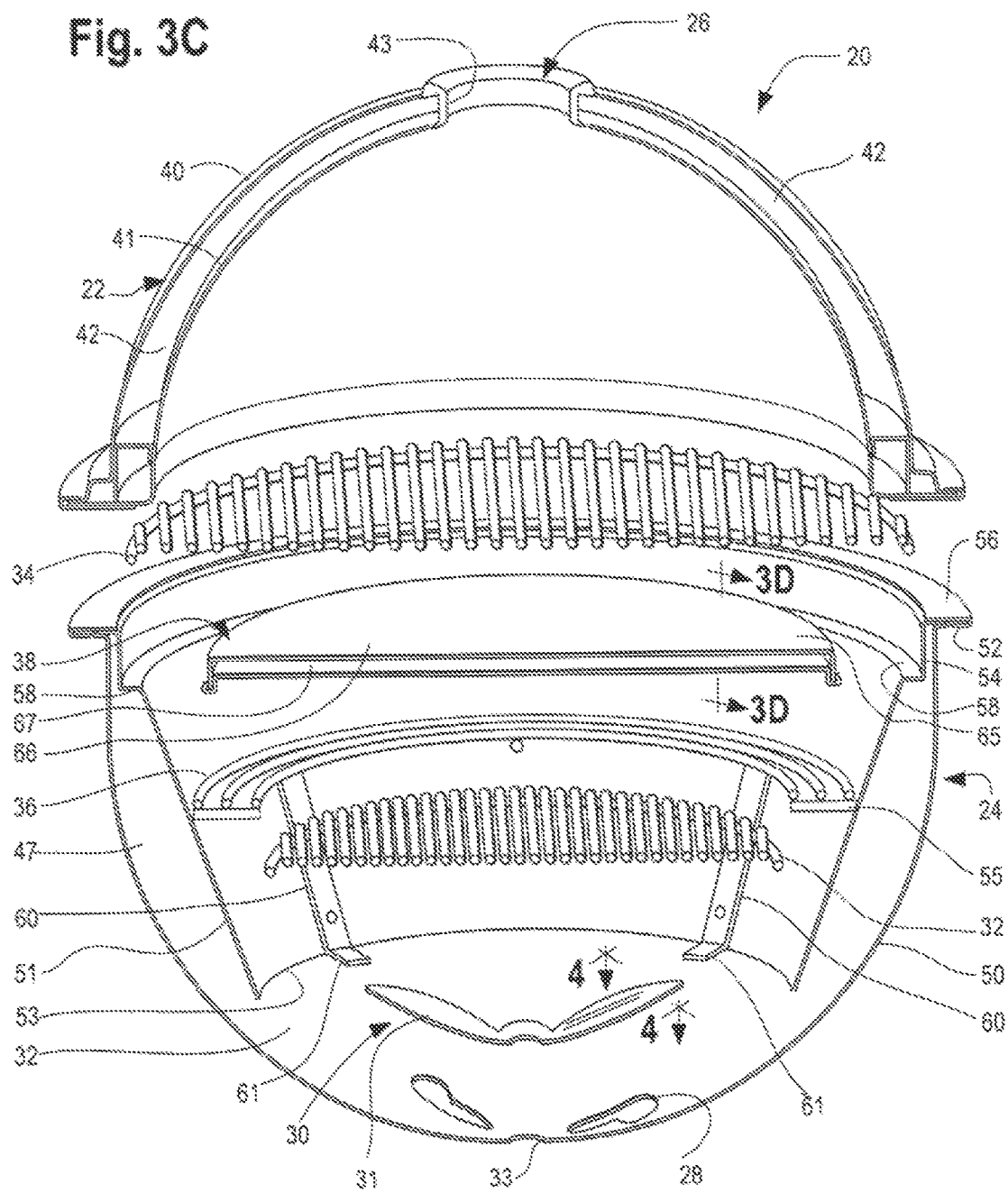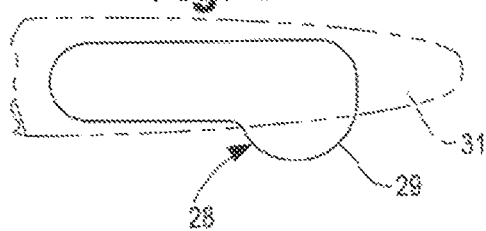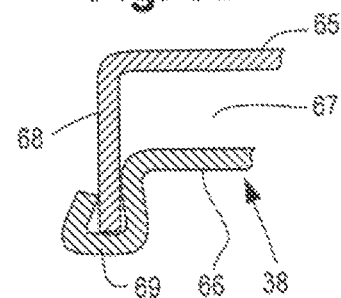

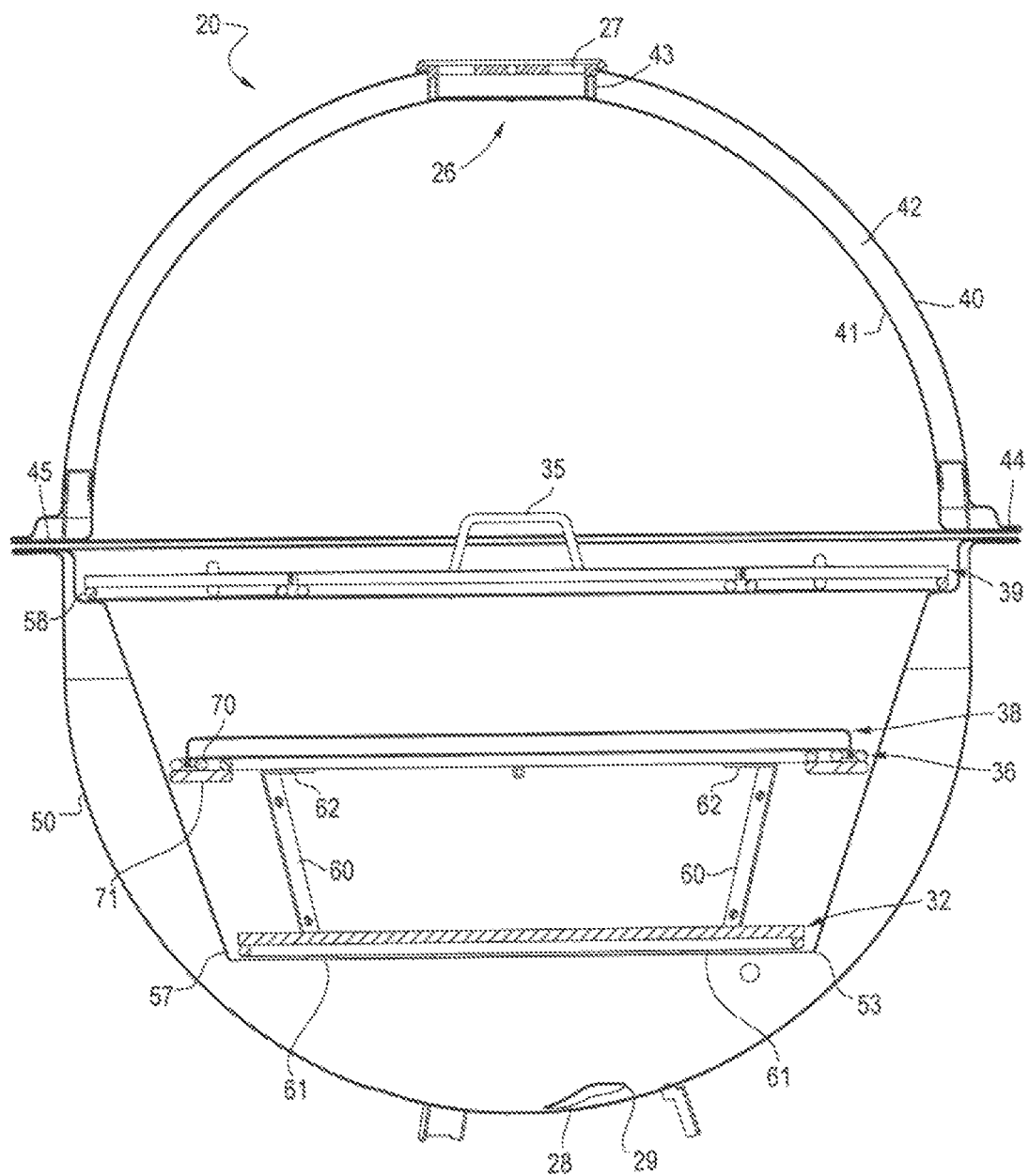

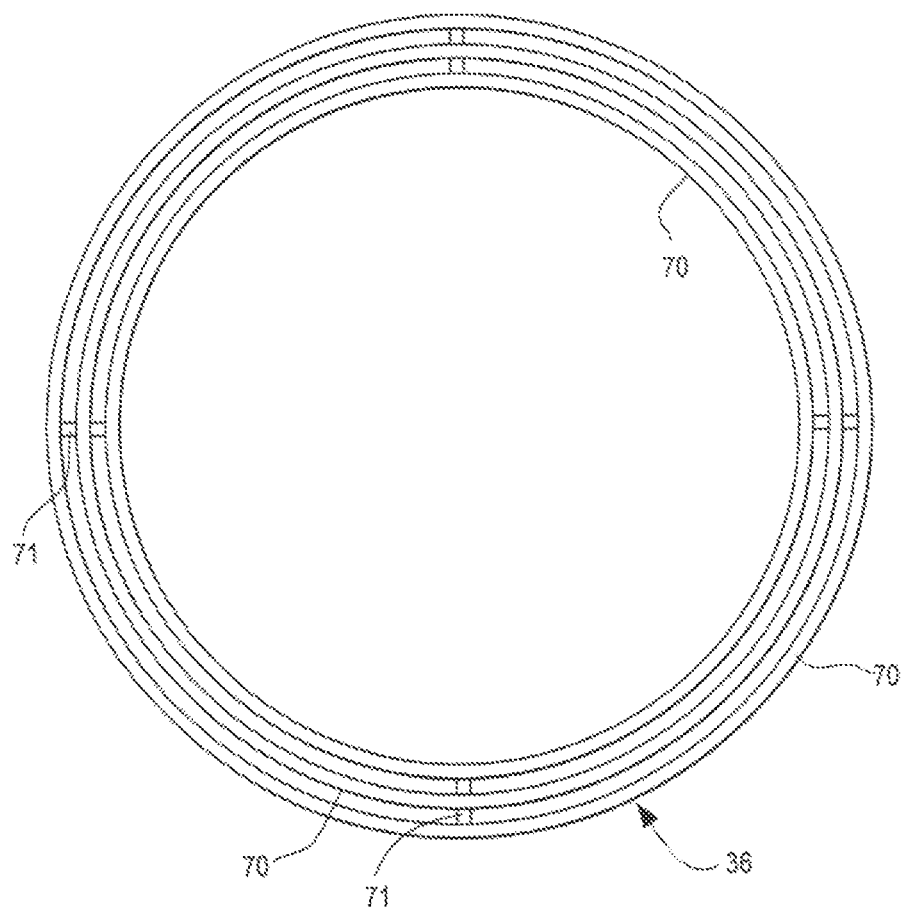
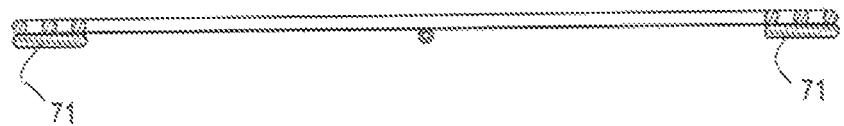

FUEL EFFICIENT GRILL FOR DIRECT AND INDIRECT COOKING

This application is a continuation-in-part of U.S. Ser. No. 14/813,852, filed on Jul. 30, 2015, now allowed, which is a continuation-in-part of U.S. Ser. No. 14/575,227, filed on Dec. 18, 2014, and claims priority to such applications, which are incorporated by reference herein in their entirety. All of these disclosures are hereby expressly incorporated by reference as part of the present disclosure as if fully set forth herein.

FIELD OF THE INVENTION

The present inventions relate to grills. More particularly, the present inventions relate to fuel efficient grills that are capable of effective slow cooking and standard grilling, permit multiple locations for a fuel grate and provide efficient air flow and heat transfer. The present inventions further relate to vent assemblies and deflector or diffuser plates that provide for increased heat control, improved air flow and the easy addition of fuel.

BACKGROUND OF THE INVENTION

Kamado type grills have been in use for many years. Kamado typo grills have increased in popularity, particularly for those individuals that desire to slow cook or smoke foods using charcoal and the like as a fuel source.

Early examples of Kamado grills are shown and described in U.S. Pat. No. 3,276,440 and U.S. Design Patent No. D201,416. FIGS. 1A, 1B and 2 of this patent show a representative prior art Kamado typo grill and a related slow cooking accessory. In general, such grills include a ceramic body 1 and a ceramic lid 2 which may be attached to the body with a hinge. The body 1 typically includes a side intake or draft door 3 to permit the intake of combustion air and the lid 2 includes a top vent 4 which permits hot air to exit. In this manner, air goes into the side draft door 3, is heated by the coals and circulates to the top vent 4 for discharge.

The interior of typical Kamado grills includes a firebox 5, also typically made of ceramic. The firebox 5 supports a fuel grate 6 spaced a short distance from the bottom of the body 1 and upon which charcoal or other fuel is placed. The firebox 5 fixes the location of the fuel grate 6 within the grill. The firebox 5 in turn supports an annular fire ring 7 which in turn supports the cooking grid 8 upon which the food to be cooked is placed. The fire ring 7 functions as a spacer to raise the cooking grid 8 above the fuel grate 6. In this configuration, a grill of this type is most often used for standard grilling, i.e., direct heat under the cooking grid with no heat deflecting barrier between the fuel grate and cooking grid.

The above described Kamado type grills are also used, and in fact are popular for, indirect or convection slow cooking. When this mode of cooking is desired, Kamado type grills typically use a plate-shaped insert 9 with upstanding legs 10 that forms a heat barrier or deflector between the fuel grate 6 and cooking grid 8, as shown generally in FIG. 2. See also, U.S. Publication No. 2014/0224750. Typically, the deflector plate 9 is also made of ceramic. In general the ceramic heat deflector 9 is placed on top of and is supported by the fire ring 7, with legs 10 as part of or associated with the deflector 9 in an upstanding position. The cooking grid 8 is then placed on the legs 10. In this manner, the heat from the coals is supposed to be deflected by the deflector plate 9 and rise around the exterior recessed edges of the deflector plate 9 to cook the food by convection. The ceramic components are thought to aid in the slow cooking and/or smoking process by retaining heat. In addition, the structure and material of the grill are thought to conserve fuel during the slow cooking process.

A commercially available Kamado type grill is known as the Big Green Egg® by The Big Green Egg, Inc. (biggreenegg.com). (This device is similar to that described above in FIGS. 1A, 1B and 2, and is further shown and described in U.S. Pat. No. 7,644,711. That patent discusses the general configuration of the Big Green Egg, but is more specifically directed to a spark arrestor and airflow control located on the side of the grill body near the bottom (see also related design Patent Nos. D615,814 and D615,807). The embodiment shown in the above referenced utility patent describes the direct cooking configuration. When indirect or slow cooking is desired, a ceramic deflector plate with upstanding legs is typically placed upon the fire ring with the legs pointed upward. The cooking grate is then placed on top of the legs. The deflector plate is used to facilitate indirect cooking by providing a heat deflecting barrier between the cooking grid and the fuel grate. The ceramic deflector plate, in conjunction with the ceramic body and domed lid, are intended to radiate heat while preventing flames and heat from cooking the food too quickly. It is also believed that less fuel is consumed.

Other similar Kamado type grills are also available, such as the Kamado Series by Vision Grills (see visiongrills.com). These grills are similar in structure and operation to the Big Green Egg and also use ceramic for the main structural components. These grills also have a firebox that supports the fuel grate at a fixed position near the bottom of the grill body and combustion air intake/draft doors on the bottom side of the grill body. The basic design, as well as a side intake and an ash catcher system, is shown and described in U.S. Publication No. 2011/0283990 A1. These grills also have an available ceramic deflector plate with upstanding legs that is placed and functions as discussed above. Kamado Joe, by Premier Specialty Brands, is another commercially available Kamado type grill, which is also similar in structure and function to the Big Green Egg (see kamadojoe.com). This device also has an available ceramic deflector plate with upstanding legs that may be used for indirect or convection slow cooking. Like the other devices discussed above, the Kamado Joe has a fuel grate which is supported in a fixed position near the bottom of the grill by a firebox. It also has a side air intake and ash drawer (see U.S. Pat. No. D683,177). As indicated, the lid and body of the foregoing Kamado type grills are constructed of ceramic. In addition, the available deflector plates for these grills are also typically made of ceramic.

Another commercially available, Kamado type grill, is known as the Broil King Keg by Onward Manufacturing Co., Ltd., which is generally shown and described in U.S. Publication No. 2009/0308373 A1. The major components and overall shape are largely similar to the ceramic Kamado type grills discussed above. For example, this grill has a draft door on the bottom side of the grill body and a fuel grate at a fixed position near the bottom of the grill body. However, unlike the above described ceramic grills, the body and lid of the Broil King Keg grill in constructed of double walled steel, with a plenum formed between the inner and outer steel shells. Although the identified published patent application describes that the plenum may be filled with air, in the preferred embodiment, as well as the commercial embodiment, the plenum between the double walls is filled with an insulating material, such as fiberglass. In addition, a deflector plate is available for the slow cooking mode, which is positioned between the fuel grate and cooking grid. The available deflector plate is described as preferably constructed from a solid piece of cast iron.

The commercially available Kamado type grills all suffer from several drawbacks. For example, the grills made from ceramic are exceedingly heavy and fragile. They are also expensive to ship and manufacture. In addition, ceramic does not release heat as well as other materials which impedes proper heating, convection and air flow and increases fuel consumption. Even the insulation filled, non-ceramic grill discussed above is heavy and cumbersome. And, the insulation is prone to becoming damp, which increases the weight and diminishes the insulating ability of the insulation.

In addition, all of the foregoing grills have fuel grates at a fixed position near the bottom of the grill. While such a position may be suitable for slow cooking by keeping the heat source further from the cooking surface, when these grills are used for direct cooking, the heat source is undesirably far from the cooking grid. This lack of flexibility requires the use of additional fuel, poor heating and can lead to uneven cooking.

Like the single position fuel grate, the side drafts or air intakes found on the known commercially available Kamado typo grills are also a disadvantage in certain grilling situations. For example, the bottom side vent location may be suitable (but not ideal) for slow or convection cooking. However, even with slow cooking, the side draft provides uneven air flow and creates unbalanced combustion, which begins behind the side draft door. This inhibits proper combustion and reduces convention. And, when used for direct cooking, the side drafts do not permit the fuel to get as hot as may be desirable. Thus, temperature is often difficult to control and heat dispersion suffers.

It has also been determined that the ceramic and cast iron deflector plates used with the Kamado type grills often result in overcooking the food. This is because they are place too close to the cooking grid and do not permit adequate air flow for convection or slow cooking. In addition, the materials used for the deflector plates, such as ceramic and cast iron, can overheat and become a cooking surface. This makes them too hot for desirable slow cooking. Moreover, known deflector plates can also make it difficult to add fuel, particularly when used for slow cooking or smoking, since cooking often takes place over many hours.

Because of the configuration of the used cooking grate, side draft air intake and the location and type of deflector plates used, the available Kamado type grills have less than optimal air flow and unbalanced combustion. As a result, more fuel is used, temperature control is difficult and cooking quality suffers. Moreover, the top vents of typical grills do not permit a high degree of adjustability. The present inventions overcome the above and other stated and inherent disadvantages.

Of course, standard charcoal grills are also well known and popular. Many of them are particularly useful for direct cooking. However, indirect cooking on many standard grills is often more difficult, especially for the novice user. As discussed below, others have tried to provide standard grills that efficiently slow cook, but the results have not been successful.

For example, there are charcoal grills available that use a double lined grill body (but a single layer lid) to purportedly improve air flow and more evenly cook food indirectly. Various examples of such grills are shown and described in U.S. Publication No. 2014/0165993 A1. In the embodiments discussed in this published applications (e.g., FIGS. 5A and 5B), the draft or intake for the introduction of combustion air is a series of holes located on the upper side of the grill body. The body of such grills further includes an interior wall that is designed to purportedly direct the combustion air around the sides of the grill and to exit into the grill at various positions in relation to the fuel grate. Such grills are supposed to be advantageous for, among other things, use of the grill in windy conditions. However, the air flow is not ideal and the introduction of combustion air insufficient for properly heating the fuel. In addition, the fuel grate in such grills is in a lived position that is not ideal for both direct and indirect cooking.

Finally, Danish Patent No. DK 176696 B1 (see also related published Application No. DK 200101276A) shows an insert for a grill. This insert is shaped like a bowl, having an enclosed bottom and upstanding sides (see also FIG. 3 of U.S. Publication No. 2014/0165993 A1). This technology is believed to be incorporated into a grill liner sold under the Dancook name by Saber Grills, LLC (see e.g., dancookusa-.com/main/patentedtechnology.aspx). In this device, the fuel grate is supported by the liner near the bottom of the liner, which is designed to heat the air in the grill and to catch grease and ash. Combustion air is introduced through draft holes on the bottom of the grill body. However, the combustion air is then directed up from the draft holes between the insert and the grill body. Combustion air is ultimately introduced position above the fuel grate. This device also has a fixed position fuel grate and a single layer lid, although some standard gas grills are believed to incorporate a double layer lid. Among other things, the device leads to poor air flow and heat dispersion. In addition, the liner must be removed to clean out the ash. The present inventions overcome these and other disadvantages as well.

Thus, there is a need for a fuel efficient grill that is capable of effective direct and indirect cooking that overcomes the stated and unstated shortcomings of known grills. In addition, there is a need for improved air flow and air flow control, as well as the need for ease in the addition of fuel.

SUMMARY OF THE INVENTION

The present inventions preserve the advantages of known Kamado type grills, and particularly grills for slow cooking, smoking and roasting, and overcome many of the disadvantages associated with those grills. In addition to effective indirect cooking, the present inventions preserve the advantages of standard grills, particularly for direct cooking. In general, the present inventions provide the flexibility to conduct both direct and indirect cooking using the same grill in different configurations. The present inventions also provide improved air flow and convection as well as improved temperature control and heat dispersion. The present inventions further provide for the ability to easily add fuel, both before and during cooking. The features and advantages of the present inventions are a result of the unique components and their combination.

In accordance with a preferred embodiment of the present inventions, a grill having a lid, the lid having an inner wall and an outer wall and forming a substantially hollow plenum between the inner wall and outer wall is provided. Also provided is a grill body having a top, a bottom and a plurality of air intake slots on the bottom, the air intake slots having a key shape. Included is an insert secured within the grill body, the insert having a top portion, a bottom portion and an intermediate portion, the top portion adapted to engage the top of the grill body, the intermediate portion adapted to support an annular retaining member and the bottom portion adapted to support a fuel grate. In the preferred embodiment, a hinged deflector or diffuser plate may be supported by the annular retaining member. The annular retaining member may alternatively support a fuel grate depending upon the type of cooking desired. A preferred hinged deflector or diffuser plate includes a middle section and two end sections wherein each end section is connected by a hinge assembly to the middle section such that one or both end sections may be rotated upwardly and wherein each section includes a substantially hollow plenum. Also in a preferred embodiment, the hinged deflector plate may include two sections, wherein each section is connected to each other by a hinge assembly such that either section may be rotated upward and wherein each section includes a substantially hollow plenum. An adjustable vent assembly may also be provided.

In accordance with another preferred embodiment of the present inventions, a grill having a lid, the lid having an inner wall and an outer wall and a hollow plenum formed between the inner wall and the outer wall and including a vent hole through the inner and outer walls is provided. The grill further includes an exterior grill body having a bottom and a plurality of elongated key shaped air intake slots radiating from the center of the bottom of the body; an interior grill body member within the exterior grill body, the interior body member having an open top portion, an intermediate portion adapted to support an annular retaining member and an open bottom portion adapted to support a fuel grate, the open bottom portion in fluid communication with the plurality of air intake slots and wherein a hollow space is created between the sides of the interior grill body member and the exterior grill body member; and, an adjustable vent assembly. In a preferred embodiment, the adjustable vent assembly includes a vent collar positioned in the vent opening of the lid; a lower vent plate having a plurality of vent holes, the lower vent plate pivotably mounted to the vent collar; and, an upper vent plate having a plurality of vent holes, the upper vent plate rotatably mounted to the lower vent plate. The hinged deflector or diffuser plate may include at least two sections, wherein each section is connected to the other by a hinge assembly such that either of the sections may be rotated upward and wherein each section includes a substantially hollow plenum.

In accordance with yet another preferred embodiment, a grill having a lid, the lid having an inner wall and an outer wall and forming a substantially hollow effluent plenum between the inner wall and the outer wall and an adjustable vent assembly on the lid are provided. Included are an exterior grill body having a bottom and a plurality of air intake slots in the bottom of the exterior grill body, the slots having a key shape; and, an interior grill body member positioned within said exterior body, the interior grill body member having an open top, an intermediate portion adapted to support an annular retaining member and an open bottom portion adapted to support a fuel grate. A hinged deflector plate to be supported by the annular retaining member, the deflector plate including a substantially hollow plenum may also be provided.

In accordance with another preferred embodiment of the present inventions, a grill having a lid, the lid having an inner wall and an outer wall and forming a substantially hollow plenum between the inner wall and outer wall is provided. Also provided is a grill body having a top, a bottom and a plurality of air intake slots on the bottom, the air intake slots having a key or P shape, with three such slots being most advantageous. Included is an insert to be secured within the grill body, the insert having a top portion, a bottom portion and an intermediate portion, the top portion adapted to engage the top of the grill body, the intermediate portion adapted to support an annular retaining member and the bottom portion adapted to support a fuel grate. In its preferred form, the insert has the shape of an inverted and truncated cone with an open bottom and creates at least a partial double walled construction of the grill body when secured within the grill body. When indirect cooking is desired, the present inventions provide a deflector or diffuser plate that is supported by the annular retaining member. In its preferred form, the defector plate has a first layer and a second layer, such that a hollow plenum is created between the first and second layers. When direct cooking is desired, the deflector plate is not used and optimally, the fuel grate is moved to and supported by the annular retaining member. A damper assembly may also be provided that selectively restricts the size of the opening of the key shaped slots to control the amount of combustion air and to allow ash removal.

The present inventions also provide a grill having a lid, the lid having an inner wall and an outer wall and a hollow plenum formed between the inner wall and the outer wall. A grill body is also provided which includes an exterior grill body having a bottom and a plurality of elongated, preferably key shaped air intake slots radiating from the center of the bottom of the body; and an interior grill body member within the exterior grill body, the interior body member having an open top portion, an intermediate portion adapted to support an annular retaining member and an open bottom portion adapted to support a fuel grate, the open bottom portion being in fluid communication with the plurality of air intake slots and wherein a hollow space is created between the sides of the interior grill body member and the exterior grill body member. When optimal direct cooking is desired, the annular retaining member supports a fuel grate so that the fuel is supported closer to the cooking grid. When optimal indirect cooking is desired, the annular retaining member supports a deflector plate and fuel grate is secured on the bottom portion of the inner grill body portion. The optimal deflector plate is a double walled construction and a hollow plenum is formed between the double walls. The present inventions also provide that the outer diameter of the annular retaining member is greater than the outer diameter of the deflector plate such that convection air can pass upward between the deflector plate and the interior grill body member. In preferred embodiment, an approximate one-half inch space is provided. Also as preferred, the inner body member is in shape of an inverted, truncated cone. And the space between the interior body member and exterior body member acts to insulate the grill body.

The present inventions further provide a grill including a lid, the lid having an inner wall and an outer wall and forming a substantially hollow effluent plenum between the inner wall and the outer wall; an exterior grill body having a bottom and a plurality of air intake slots in the bottom of the exterior grill body, the slots having a key shape; an interior grill body member positioned within said exterior grill body, the interior grill body member having an open top, an intermediate portion adapted to support an annular retaining member and an open bottom portion adapted to support a fuel grate; and, a deflector plate capable of being supported by the annular retaining member, the deflector plate having a substantially hollow plenum. The annular retaining member is configured so it may alternatively support a fuel grate. In a preferred embodiment, the interior grill body member is shaped like an inverted, truncated cone. In addition, a plurality of support brackets which are attached to the inside of the interior grill body member, and are adapted to support the fuel grate and the annular retaining member is also preferred.

A deflector plate for use in a grill is also provided. A preferred deflector plate has a first layer and a second layer, the layers attached to one another. A substantially hollow plenum is created between two layers. It is preferred, but not required, that the deflector plate be made of porcelain covered steel or stainless steel and that it be supported in the grill by an annular retaining member. It is also preferably generally circular. In a preferred embodiment, the space between the two layers is approximately one half inch. In this manner, the deflector plate deflects the heat from the burning fuel but does not act as a heat source.

In another preferred embodiment of the deflector plate, a hinged deflector or diffuser plate is provided. The preferred hinge deflector plate includes a middle section, the middle section having a first layer and a second layer, the second layer attached to the first layer and a substantially hollow plenum formed between the first and second layers; two end sections, each end section having a first layer and a second layer, the second layer attached to the first layer and a substantially hollow plenum formed between the first and second layers; a first hinge assembly connecting one end section to the middle section; and, a second hinge assembly connecting the other end section to the middle section.

Another preferred hinged deflector plate is also provided, wherein two sections, each having a first layer, a second layer, a substantially hollow plenum between the first and second layers and a hinge assembly connecting one section to the other are provided. The hinged deflector plate may be supported in the grill by the annular retaining member.

The present inventions also provide for an adjustable vent assembly for controlling the venting of air through a grill, the grill having a lid with a vent opening. A preferred adjustable vent assembly includes a vent collar (or other means to help create the vent opening) positioned in the vent opening of the lid; a lower vent plate having a plurality of vent holes, the lower vent plate pivotably mounted to the vent collar; and, an upper vent plate having a plurality of vent holes, the upper vent plate rotatably mounted to the lower vent plate. In the preferred adjustable vent assembly, the lower vent plate may include an opposing pair of downwardly projecting pivot tabs, the vent collar may include an opposing pair of pivot brackets and a pivot pin is provided to pivotably mount the downwardly projecting tabs of the lower vent plate to the pair of pivot brackets of the vent collar. Four vent holes on the lower vent plate and four vent holes on the upper vent plate may also be provided.

Accordingly, it is an object of the present inventions to provide a grill that has the flexibility for efficient indirect and direct grilling.

It is another object of the present invention to provide a grill with drafts or combustion air intakes on the bottom of the grill and which are key shaped to provide suitable intake of combustion air for efficient slow cooking and standard grilling. They also provide for easy ash removal, better temperature control and better heat dispersion.

An additional object of the present inventions is to provide a fuel grate that may be moved to a plurality of vertical heights within the grill, such that the grill may be efficiently used for both direct and indirect cooking.

A further object of the present invention is to provide an air insulated, double walled air insulated deflector plate or an air insulated hinged deflector plate, either of which aids in indirect cooking and helps regulate temperature without allowing direct heat transfer or by absorbing and emitting heat to the same degree as ceramic and case iron plates and the like.

Still another object of the present invention is to provide a deflector plate or hinged deflector plate support structure or annular retaining member that selectively supports the deflector plate and/or fuel grate without removal of the annular retaining member and which permits adequate air flow for convection or indirect cooking and also permits effective direct cooking when a fuel grate is supported thereby.

Still yet a further object of the present inventions is to provide a hinged deflector or diffuser plate that permits, among other things, the easy addition of coal or other fuel and increased heat control (by, for example, permitting a portion or section of the deflector plate to be opened during cooking).

Still a further object of the present inventions is to provide an air insulated, double walled lid.

Still yet another object of the present inventions is to provide a liner or insert for the grill body that may support a deflector plate and/or a fuel grate and provides air insulation between the liner and the grill body for heat retention and fuel efficiency.

Still yet an additional object of some embodiments of the present inventions is to prevent air flow between the liner and the grill body and to direct hot air from the lower air intakes up through the open bottom of the liner and through the top of the grill.

Yet another object of the present invention is to provide a grill that has a grill body, at least a portion of which is of a double wall construction.

Yet a further object of the present inventions is to provide the slow cooking features of a Kamado type grill while keeping the direct cooking features of a standard charcoal grill.

Yet an additional object of the present invention is to provide a charcoal grill having improved air flow for more efficient cooking, is lightweight and has reduced fuel use.

A further additional object of the present invention is to provide an adjustable top vent or lid damper assembly, including rotatable and hinged members that provide a full range of adjustment of the vent opening from fully closed to fully open.

INVENTOR'S DEFINITION OF THE TERMS

The following terms which may be used in the various claims and/or specification of this patent are intended to have their broadest meaning consistent with the requirements of law:

"Direct cooking" or "standard grilling" as used herein shall mean cooking food on a cooking grid that is located directly above the heat source without a heat deflecting barrier between the heat source and cooking grid.

"Indirect cooking" or "slow cooking" as used herein shall mean cooking with a heat deflecting barrier, such as a deflector plate, interposed between the heat source and the cooking grid such that hot air is directed around the deflector plate and/or circulated around the food. Indirect cooking is generally suitable for smoking or slow cooking or any situation where convection cooking is predominantly desired.

"Cooking grid" as used herein shall mean the surface upon which food is placed for cooking. The cooking grid, also referred to as "cooking surface" or "cooking grate," may be made from a grid of stainless steel wire, cast iron and the like.

"Fuel grate" as used herein shall mean the structure used to support the coal, charcoal, wood or similar fuel for burning within the grill.

"Vent" or "top vent" as used herein shall mean the structure typically found on the lid of the grill, which is typically adjustable, that permits the selective release or venting of hot air from the grill.

"Draft" or "intake" openings as used herein shall mean the structure and/or opening on the grill body that permits the intake of combustion air to aid in the combustion of the fuel.

Where alternative meanings are possible, in either the specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 1B is an exploded perspective view of the prior art Kamado style grill of FIG. 1A showing the typical internal components;

FIG. 3C is an exploded perspective view of a preferred embodiment of the present invention of FIG. 3A;

FIG. 3D is a cross-sectional detail view of an edge of a preferred double walled deflector plate of the present invention taken along lines 3D-3D of FIG. 3C;

FIG. 4 is a top plan view of one of the preferred draft or intake slots of the present invention shown with a representative blade of an optional damper for restricting the size of the openings of the slots and cleaning ash;

FIG. 7 is a side cross-sectional view of a preferred embodiment of the present invention shown configured for optimal slow cooking with a preferred deflector plate supported by the annular retaining member and the fuel grate supported at the bottom of the interior grill body or insert;

FIG. 8A is a top plan view of a preferred embodiment of the annular retaining member of the present invention;

FIG. 8B is a side cross-sectional view of the annular retaining member of FIG. 8A, taken along lines 8B-8B;

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent. Various preferred embodiments of preferred grill components are also shown and described herein.

Figure 1A:
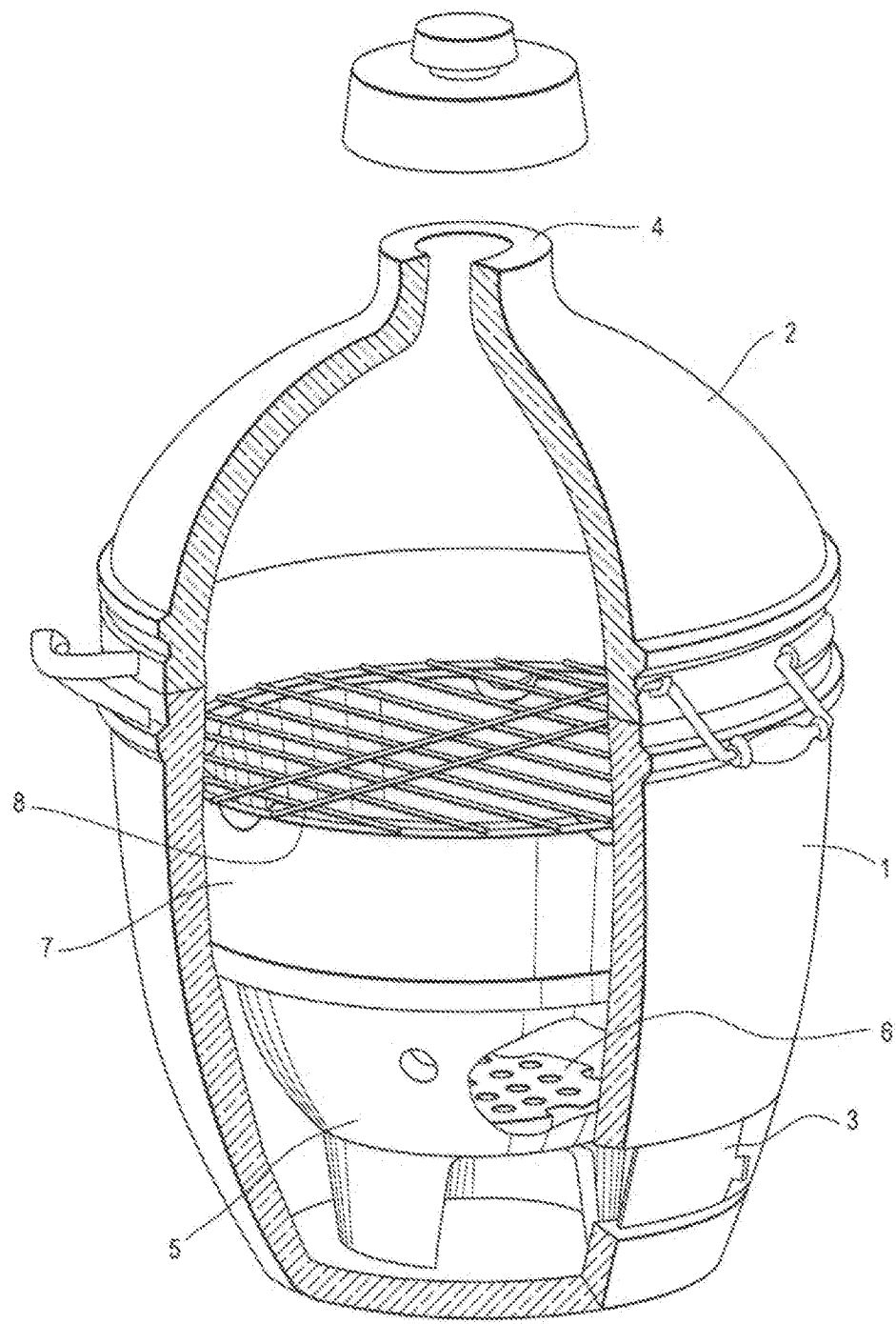
FIG. 1A is a perspective view of a representative prior art Kamado type grill with portions cut away to reveal the interior components.
Figure 2:
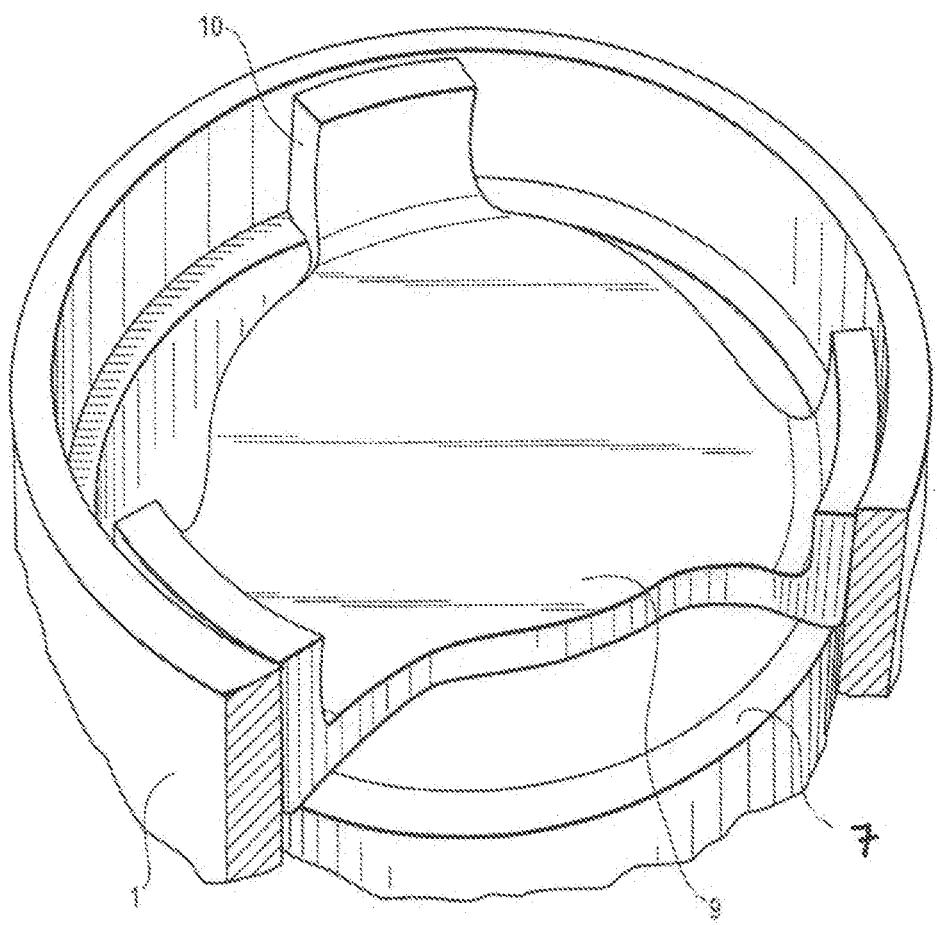
FIG. 2 is a perspective view of a typical prior art deflector plate for use in slow cooking in the prior art grill of FIG. 1A.
Figure 3A:
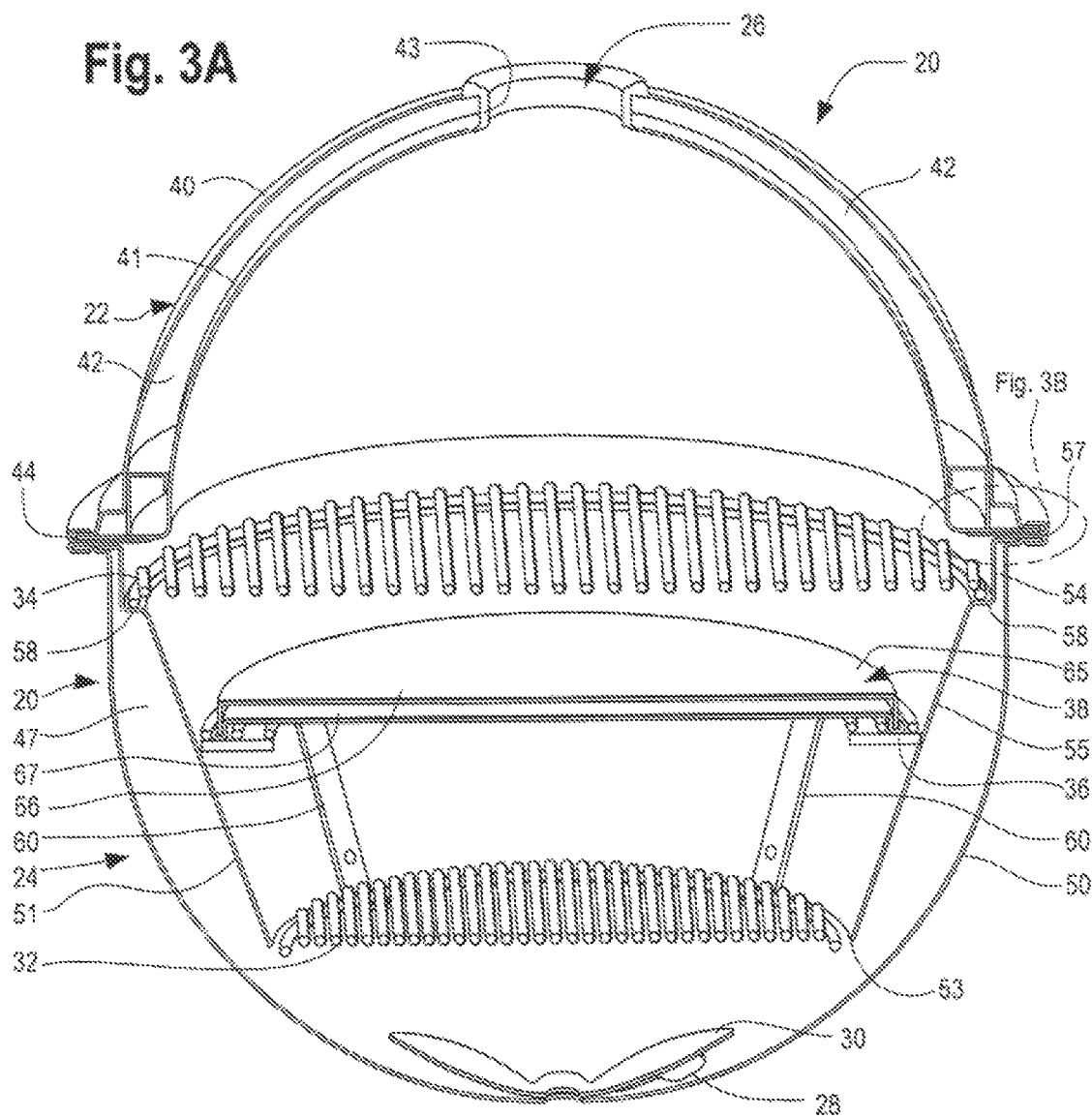
FIG. 3A is a cross-sectional perspective view of a preferred embodiment present invention, shown arranged for optimal indirect cooking.

Examples of the present inventions may be seen by reference to FIGS. 3A-8B. A preferred embodiment of grill 20 is shown in FIG. 3A. Although preferred, but not a limitation, the overall shape is similar to, but slightly more elongated than, the typical Weber® kettle. The silhouette of the Weber kettle grill is a registered trademark of Weber-Stephen Products LLC. In addition, the preferred material for construction of the lid 22 and grill body 24 is porcelain coated steel or stainless steel. The grill 20 includes a lid 22 and a grill body 24. Lid 22 may be attached to body 24 with optional hinges (not shown). It will be understood by those of skill in the art that hinges are not required and that if desired, there are a variety of well known hinges from which to choose.

Lid 22 includes a vent 26 that is preferably located in the top center. It has been determined that the location of the vent 26 and vent opening 28 at the top center of the grill lid 22 is best for indirect cooking and is also suitable for direct cooking, although other locations for vent 26 on the lid 22 may be used as will be understood by those of skill in the art. Vent 26 typically includes a cover 27 (see FIGS. 6 and 7) which is rotatably adjustable and may contain a plurality of holes. The vent 26 opening may be increased or decreased by rotating the vent cover 27. Examples of suitable vent covers 27 are well known to those of ordinary skill in the art. However, a unique and preferred vent cover 27, referred to herein as adjustable vent assembly 80, is shown in FIGS. 9-12 and discussed in more detail below. This adjustable vent assembly may be used with the grills of the present inventions but may also be used independently with a wide variety of other charcoal and gas grills.

The bottom of grill body 24 includes a series of draft or air intake slots 28 that permit the introduction of combustion air into the grill 20. Known grills have used a series, and preferably three, radially elongated slots as the draft for the grill. However, and as hereinafter described, it has been determined that, unique key or P shaped air intake slots or drafts 28 are preferred and enable efficient combustion, proper air flow and the preferred amount of adjustability for both direct and indirect cooking.

As partially shown in FIGS. 3C and 4, a damper 30 may also be provided. Damper 30 may be used to restrict the opening size of drafts 28 and may also be used to remove ash from the grill. Damper 30 may consist of a number of inverted V-shaped blades 31 attached to a center post (not shown) though a central hole 33 in the bottom of the grill body 24. Preferably, damper 30 is a shutter type damper wherein the blades 31 extend from and are rotatably secured to the center post. A handle (not shown) that protrudes through the grill body 24 may be provided to enable the user to rotate the blades to remove ash or to adjust the size of draft slots 28 to adjust the amount of combustion air. A preferred example of a damper 30 that may be utilized with the present inventions is shown and described in U.S. Pat. No. 4,416,248 to Weber-Stephen Products LLC, which is incorporated herein by reference.

Grill 20 also includes a fuel grate 32 upon which charcoal, coal, wood or another fuel to be burned may be placed. A cooking grid 34, which may include an optional handle 35, is also provided. Cooking grid 34 supports the food to be cooked. A plurality of legs (not shown) may also be provided on grill body 24, although other types of stands, carts and/or tables may be suitable in certain circumstances and as understood by one of skill in the art. In a preferred embodiment, an annular retaining member 36 is provided which is capable of supporting a deflector or diffuser plate 38, hinged deflector or diffuser plate 38[1] or a fuel grate 32, depending upon the type of cooking desired, as hereinafter described.

It will be understood by those of ordinary skill in the art that a variety of features may be added to grill 20 compatible with the present inventions. For example, various ash catchers (not shown) may be incorporated. Examples of suitable ash catchers are shown and described in U.S. Pat. Nos. 4,576,140; 4,498,452; 5,036,832; 6,155,248; and 6,318,356, all of which are assigned to Weber-Stephen Products LLC and are incorporated herein by reference. Similarly, a variety of fuel igniters (not shown) may be provided for use with the present inventions. Examples of suitable igniters that may be applied to the present inventions include those shown and described in U.S. Pat. Nos. 5,213,075; 4,941,817; and/or 4,302,181. All of these patents are also assigned to Weber-Stephen Products LLC and are incorporated herein by reference.

Figure 3B:
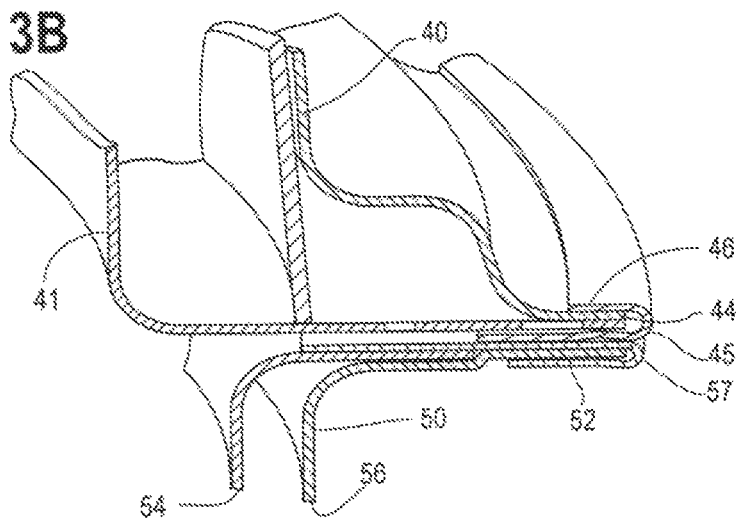
FIG. 3B is a detailed perspective view of an embodiment of the interconnection of the inner and outer walls of a preferred lid of the present invention and also showing details of the interconnection of the outer grill body and the inner grill body or insert of a preferred embodiment of the present invention, taken from insert 3B of FIG. 3A.

A preferred embodiment of double walled grill lid 22 may be seen by reference to FIGS. 3A, 3B and 3C. Lid 22 includes an inner wall 41 and an outer wall 40. The inner wall 41 and outer wall 40 are assembled or manufactured to create a substantially hollow plenum 42 between the inner 41 and outer 40 walls. Lid 22 also includes a vent opening 48 which is defined by collar 43. Preferred lid 22 is generally hemispherical, although other shapes are acceptable. As discussed, suitable known vent covers 27 may be used as are well known to those of skill in the art. In addition, a preferred embodiment of an adjustable vent assembly 80, an embodiment of which is shown in FIGS. 9-12, may be used with the grill 20 of the present inventions. The adjustable vent assembly 80 may also be used with standard gas or charcoal grills.

Outer wall 40 terminates in an outwardly facing flange 44 (sec FIG. 3B). Flange 44 is generally horizontal and extends around the circumference of the bottom of outer wall 40. Similarly, inner wall 41 also terminates in an outwardly projecting, generally horizontal flange 45. In a preferred embodiment, flanges 44 and 45 mate at their outer edges and are secured together with a circumferential clip 46. Rivets or other means may be used to secure clip 46 and/or flanges 44 and 45. In this manner, a substantially hollow, air filled plenum 42 is created between the inner 41 and outer 40 walls of lid 22, which provides the desired insulation that is particularly useful for indirect cooking.

It will be understood by those of ordinary skill in the art that inner wall 41 and outer wall 40 may be secured together in a variety of ways consistent with the present inventions. For example, they may be welded together or constructed from a single sheet of material. Bolts or rivets (not shown) may be used in lieu of clip 46. Alternatively, either of the flanges 44 and 45 may be folded over the other to create the connection between the outer 40 and inner 41 walls. In addition, beads, seals or gaskets of insulating material may also be used as will be understood by those of skill in the art.

It is not necessary for the present inventions that the plenum 42 be hermetically sealed. However, the preferred configuration described above seals the lid plenum 42 and helps prevent heat from escaping. It has been determined that the air in the plenum 42 acts as an insulator and helps lid 22 retain heat during cooking. In addition, the preferred lid 22 is lighter than those constructed of ceramic or those of metal filled with insulation such as fiberglass.

The preferred embodiment of grill body 24 is shown in FIGS. 3A and 3B. Body 24 includes an exterior body member 50 and an interior body member or insert 51. The top of outer body member 50 terminates in an outwardly projecting, circumferential, generally horizontal flange 52. Exterior body member 50 is generally hemispherically shaped, although other shapes are acceptable. The bottom of outer member 50 includes a plurality of air intake slots 28 as hereinafter described. A center hole 33 may be provided in the bottom center of exterior body member 50 to accept a center post (not shown) that rotatably supports blades 31 of a typical damper assembly 30. Legs (not shown) may be attached to exterior body member 50. A handle (not shown) may also be provided.

In a preferred embodiment, inner body member 51 is generally in the form of an insert to exterior grill body 50. Among other things, liner type inner body member 51 provides for ease of manufacture. However, it will be understood by those of ordinary skill in the art that there are a variety of ways inner body member 51 may be formed. For example, outer body 50 and inner body 51 members may be formed from a single piece of material. When assembled, a gap 47 is formed between inner body member 51 and outer body member 50 that acts as an insulator and aids in cooking and fuel efficiency.

In one preferred, liner type embodiment inner grill body member 51 is shaped like an inverted and truncated cone. Inner body member 51 has an open bottom with a bottom edge 53. Bottom edge 53 abuts the inside wall of outer body member 50. Although not required, it will be understood that bottom edge 53 may be secured to the inside of exterior body member 50 by a variety of well known means. In this preferred embodiment, the bottom edge 53 is sealed or otherwise closed when it meets the inside of exterior body member 50. In this manner, heated air is prevented from flowing between inner body member 51 and outer body member 50 so that the heated air flows upward from fuel grate 32 without significant heat loss. In other preferred embodiments, the bottom edge 53 does not abut the inside wall of outer body member 50. Thus, it is not secured to the inside wall of exterior body member 50. It has been determined that whether the bottom edge 53 abuts the inside of exterior member or whether there is a gap between the members 53 and 50 is largely a matter of design choice and manufacturing expedience.

Inner body member 51 also serves to house and/or support other components of the present inventions. Interior body 51 includes a top portion 54 and an intermediate portion 55. Top portion 54 terminates in an outwardly projecting flange 56. Flange 56 of interior body member 51 mates with and overlaps the outwardly projecting flange 52 of exterior body member 50. In the preferred embodiment, flange 56 is secured to flange 52 by annular clip 57 (see FIG. 3B). It will be understood by those of skill in the art that the top 54 of interior body member 51 may be secured to the top of exterior body member 50 in a variety of other ways, including welding or being formed from the same piece of material. Alternatively, exterior flange 52 or outward flange 56 may be folded over one or the other to fix their relative position. In addition, seals or gaskets may be provided to help seal gap 42 to provide for better insulation, which increases heat retention and fuel efficiency.

The top portion 54 of interior body member 51 is preferably provided with a generally horizontal ledge 58 formed thereon. Ledge 58 is sized to support cooking grid 34. Although ledge 58 is preferred, other means of supporting grid 34 may be used. For example, brackets (not shown) may be attached to the upper portion 54 to support cooking grid 34. In this manner, among others, the upper body portion 54 is adapted to support a cooking grid 34.

The interior of interior body member 51 is further provided with a plurality of support brackets 60 which may be attached thereto by welding, fasteners or other well known means. As shown in FIG. 3C, brackets 60 include a lower support tab 61. The lower support tab 61 projects inwardly, is generally horizontal and substantially coincides with the inner bottom edge 53 of interior body member 51. Lower support tabs 61 are sized and designed to support fuel grate 32. In this manner, and others that will be appreciated by those of skill in the art, the bottom of interior body member 51 is adapted to support fuel grate 32. It will be understood by those of skill in the art that lower support tabs 61 may be individual members and not part of a bracket 60. It will also be understood that the inner bottom edge 53 of interior body member 51 may be provided or formed with an integral, inwardly facing flange (not shown) to support the fuel grate 32.

Figure 6:
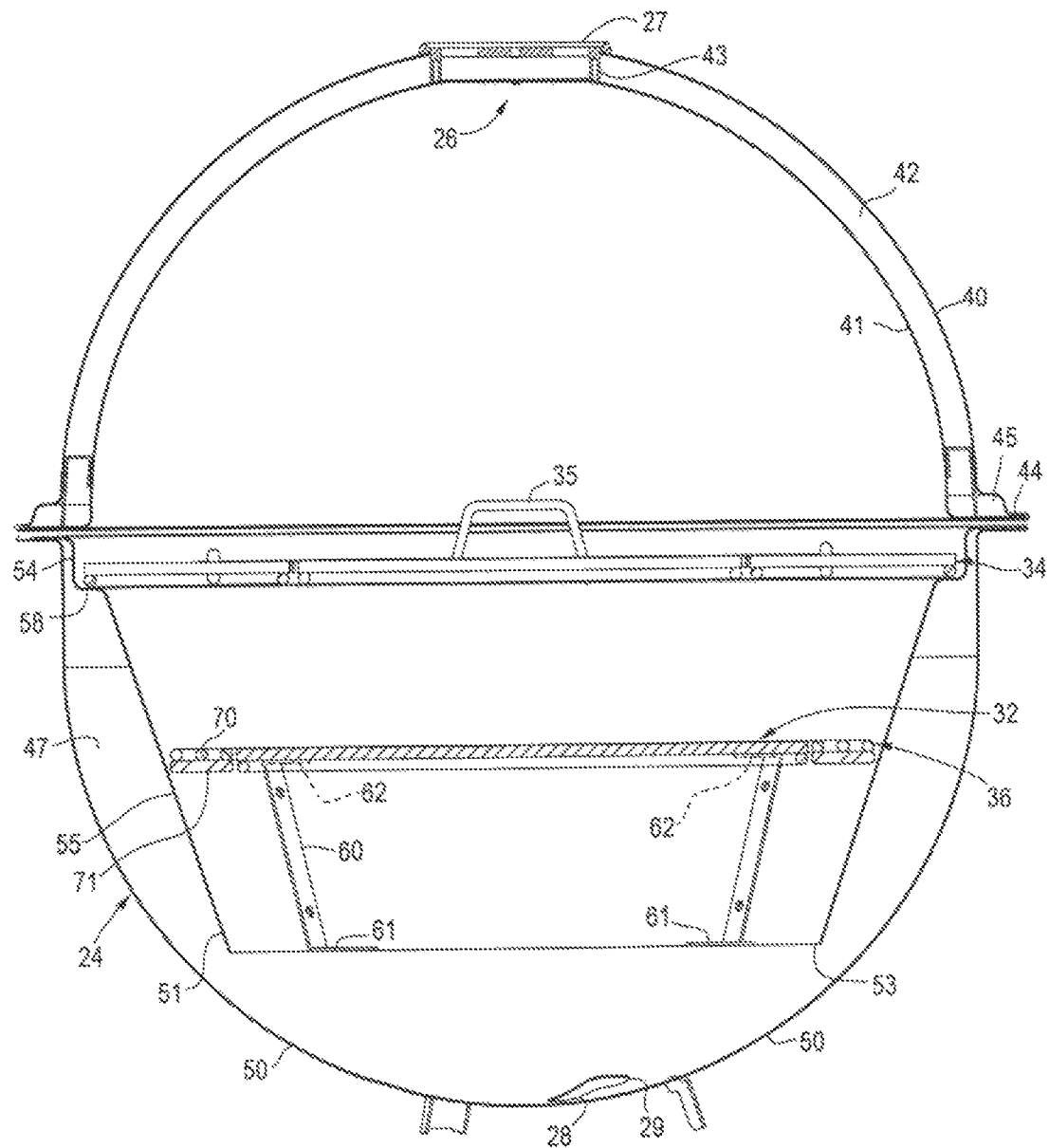
FIG. 6 is a side cross-sectional view of a preferred embodiment of the present invention shown configured for optimal standard grilling with the fuel grate supported by a preferred embodiment of an annular retaining member.
Figure 9:
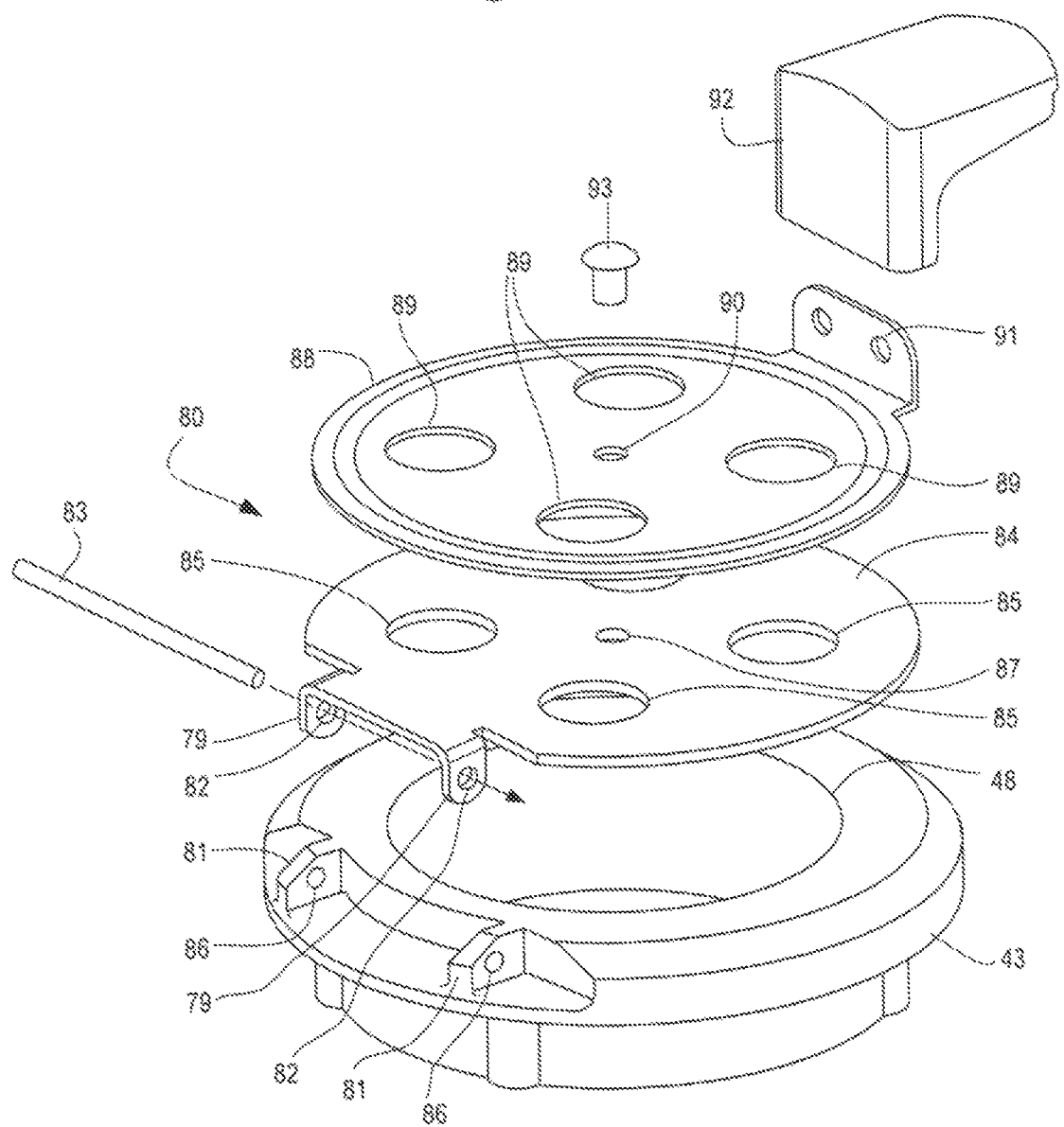
FIG. 9 is an exploded perspective view of a preferred embodiment of an adjustable vent assembly of the present invention.
Figure 10:
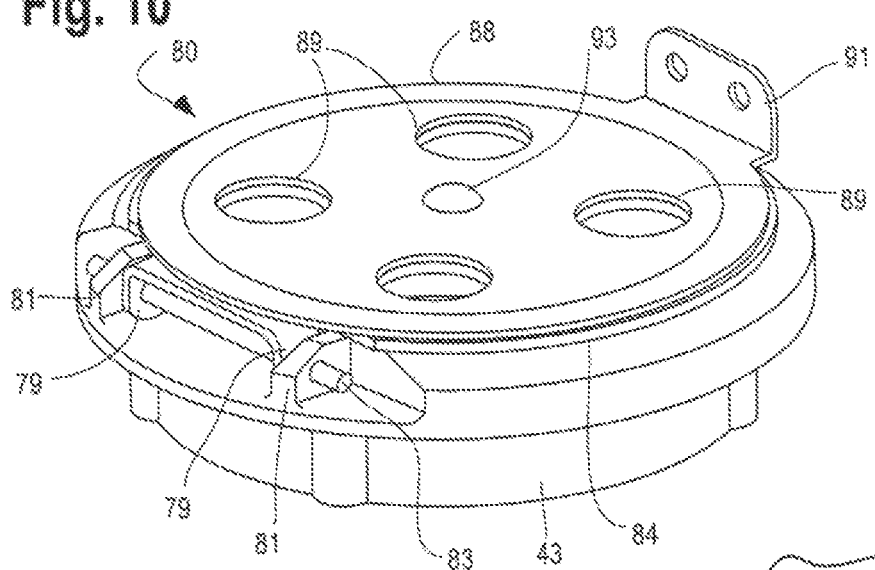
FIG. 10 is a perspective view of the preferred embodiment of the vent assembly of FIG. 9.

In the preferred embodiment, the upper end of bracket 60 is also provided with a generally horizontal, inwardly projecting upper support tab 62 (see FIGS. 6 and 7). The upper support tab 62 generally coincides with the intermediate portion 55 of interior body member 51. Upper support tabs 62 are sized and designed to support annular retaining member 36, which in turn supports either deflector plate 38 or fuel grate as hereinafter described. It will be understood that upper support tabs 62 may be individual members (not shown) which are attached to an intermediate portion of interior body member 51 and do not have to be part of preferred brackets 60. In a preferred embodiment, there are three brackets 60 equally spaced around the circumference of the interior of interior body member 51. Four brackets 60 (not shown) are also preferred. In this manner, among others that will be known to those of skill in the art, the intermediate portion 55 of inner body member 51 is adapted to support the annular retaining member which is capable of supporting a fuel grate 32 or a deflector plate 38 as desired, depending upon the type of cooking to be conducted.

Figure 5:
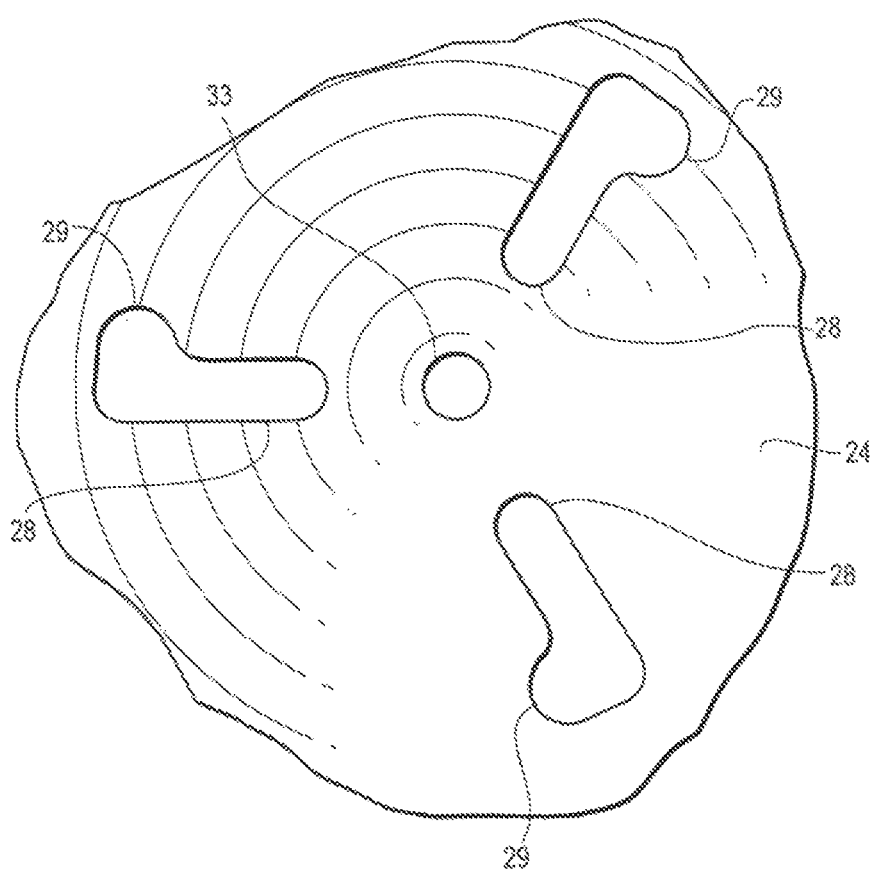
FIG. 5 is a top plan view of the preferred, key or P shaped air intake slots of the present invention on the bottom of the grill body, shown in their preferred arrangement.

Preferred draft or air intake slots 28 are best shown in FIG. 5. Intake slots 28 include a key shaped protrusion 29. It has been determined that the key or P shaped slots 28 provide the best air flow, and the most control over the air flow, for direct and indirect cooking purposes. The amount of combustion air permitted may be adjusted by, for example, V-shaped blades 31 of damper 30 (see FIGS. 3A, 3C and 4). It should be noted that because of key shaped protrusion 29, there is an intake opening even if blades 31 are in the fully closed position as shown in FIG. 4. This is particularly desirable for optimal slow or indirect cooking.

A preferred deflector or diffuser plate 38 may be seen by reference to FIGS. 3A, 3C and 3D. Deflector plate 38 is generally circular and includes a first layer 65, a second layer 66 and a substantially hollow plenum 67 formed between the first 65 and second 66 layers. In a preferred embodiment, first layer 65 has a downwardly projecting member around its circumferential edge. Second layer 66 has a U-shaped channel 69 around its circumferential edge. Downwardly projecting member 68 is crimped with U-shaped channel 69. It will be understood by those of skill in the art that first layer 65 and second layer 66 may be attached or secured to each other in a variety of well known ways and to create the plenum 67. The outside edges of deflector plate 38 are supported by annular retaining member 36. The plenum 67 in the deflector plate 38 prevents plate 38 from becoming too hot and acting as a cooking surface and heat deflector when used for indirect cooking. In the preferred embodiment, the plenum 67 formed between the first layer 65 and second layer 66 is approximately one half inch.

An alternative preferred embodiment of deflector or diffuser plate 38 is shown as $38^1$ in FIGS. 13-17. In one embodiment, the hinged deflector plate $38^1$ is divided into three segments: namely, middle section 38A and two end sections 38B and 38C. The sections 38A, B and C are attached using deflector hinge mechanism 110 as hereafter described. It will be understood by those of skill in the art that while a circular shape of deflector plates 38 and $38^1$ are preferred, they may be other shapes to coincide with the interior shape of the grill and/or annular retaining member 36 if they are supported by such a member. Middle section 38A includes a first layer 65A that includes a perimeter lip portion 63A. Middle section 38A also includes a second layer 66A having a perimeter lip portion 64A designed to mate with and be attached to lip 63A. It will be understood by those of skill in the art that first layer 65A and second lever 66A of middle section 38A may be attached together at perimeter lip portion 63A of first layer 65A and perimeter lip portion 64A of second layer 66A by screws, rivets, welding or other means (not shown). When connected together, a substantially hollow plenum 67A is formed between the first layer 65A and second layer 66A of middle section 38A.

Similarly, end sections 38B and 38C have a first layer 65B and 65C, each having a lip portion 63B and 63C and a second layer 66B and 66C, each also having a lip portion 64B and 64C. First layers 65B and 65C are attached to second layers 66B and 66C at lip portions 63B and 63C and lip portions 64B and 64C forming a substantially hollow plenum 67B and 67C between each layer 65B and 65C and 66B and 66C.

Figure 14:
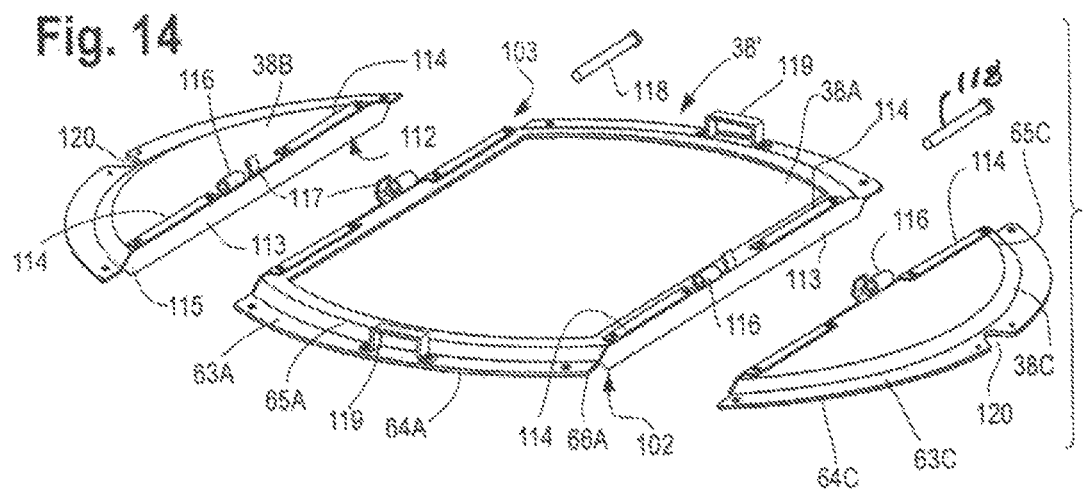
FIG. 14 is an exploded perspective view of the hinged deflector plate of FIG. 13 showing two end sections, a middle section and preferred hinge assembly components connecting the end sections to the middle section.
Figure 15:
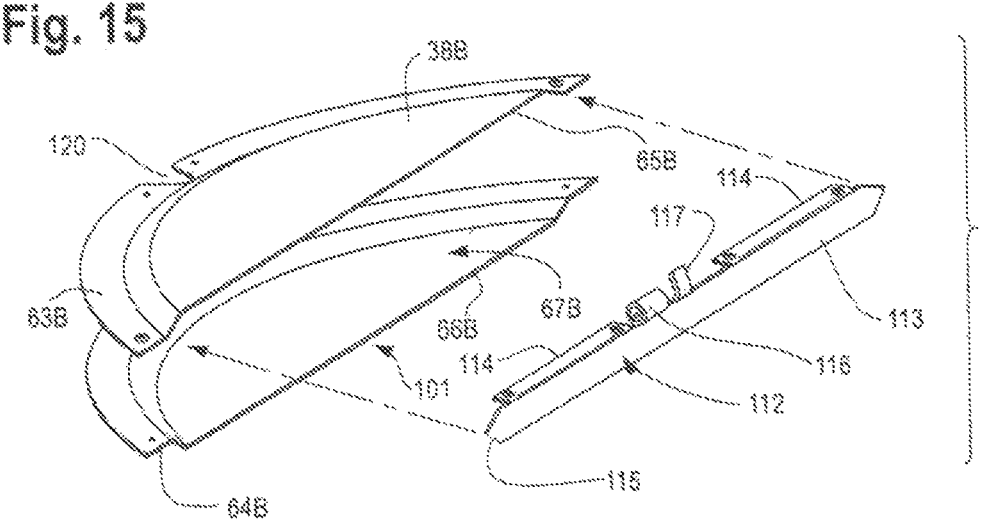
FIG. 15 is an exploded perspective view of a preferred end section of a preferred deflector plate showing the first and second layers forming a substantially hollow plenum and the hinge member associated with that section.

As best shown in FIGS. 14 and 15, and because a preferred alternative hinged deflector plate $38^1$ has been divided into three sections, when first layers 65B and 65C of end sections 38B and 38C are attached to second layers 66B and 66C as described, each end section 38B and 38C has an open end 101 (one open end 101 of section 38B is shown in FIG. 15). Similarly, when the first layer 65A is attached to second layer 66A of middle section 38A, there are two open ends 102 and 103 associated with middle section 38A. Open end 101 of end section 38B is adjacent to one of the open ends 103 of middle section 38A and the other open end 102 of middle section 38A is adjacent to open end 101 of end section 38C. In the preferred embodiment, a hinge assembly 110 is also provided to connect the end sections 38B and 38C to the middle section 38A. In a preferred embodiment, portions of the hinge assembly 100 also close the open ends 101, 102 and 103 and help form the plenums 67A, 67B and 67C in sections 38A, 38B and 38C. As a result, each section forms a substantially hollow plenum 67A, 67B and 67C when interconnected by hinge assembly 110.

Figure 16:
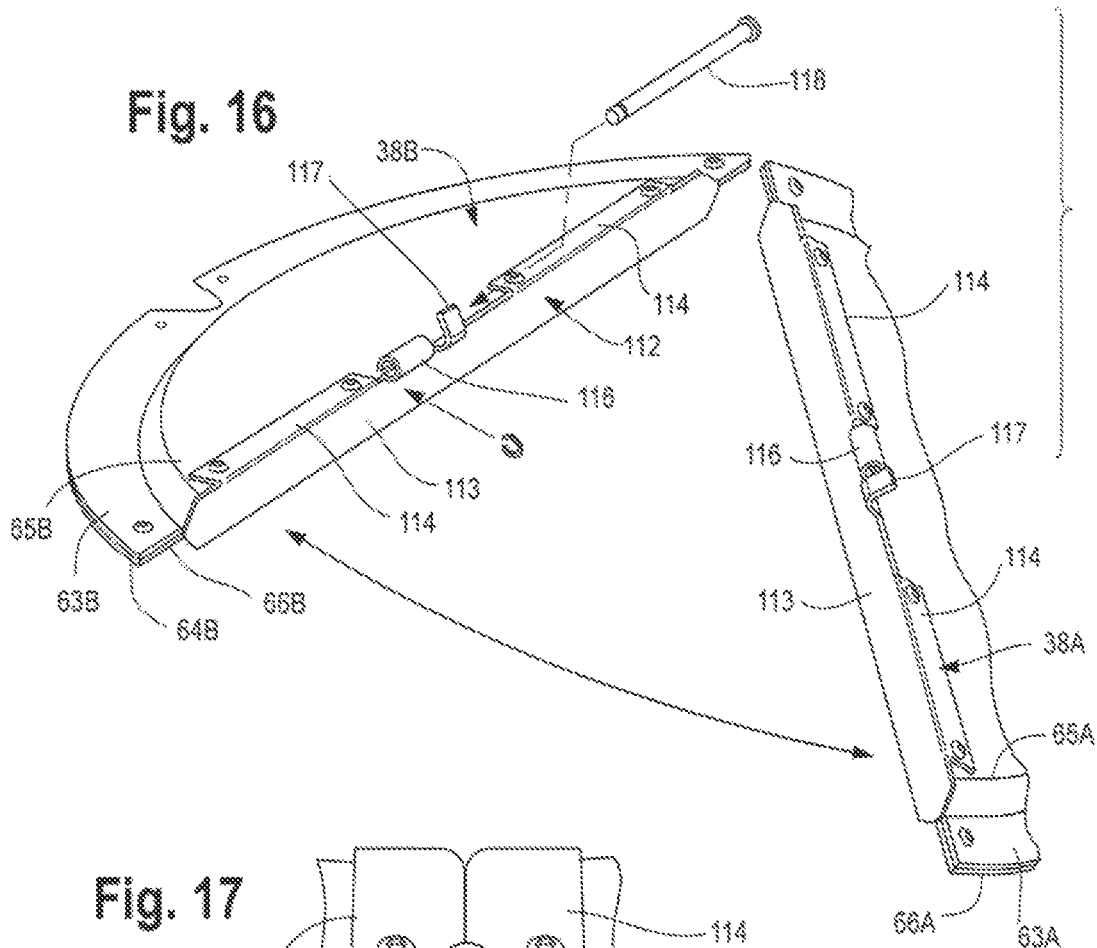
FIG. 16 is a perspective view of an end section and associated hinge member and middle section and associated hinge member of a preferred hinged deflector plate shown prior to assembly of the hinge assembly, and is also representative of an embodiment of a hinged deflector plate having only two sections; and, FIG. 17 is a perspective view of the end and middle sections of the hinged deflector plate of FIG. 16 shown connected together with a preferred hinge assembly.
Figure 17:
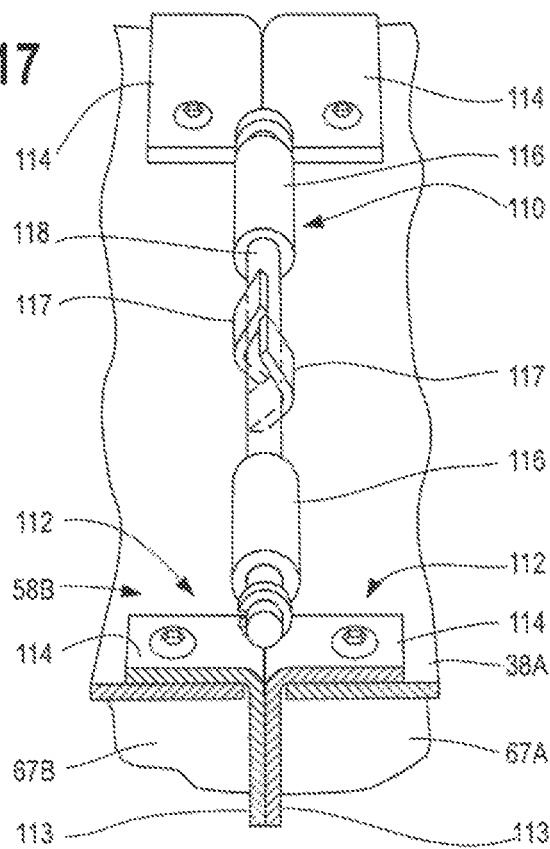

A preferred embodiment of hinge assembly 110 may best be seen by reference to FIGS. 14, 16 and 17. As preferred, there are two hinge assemblies 110 pivotably connecting the end sections 38B and 38C to middle section 38A. If deflector plate $38^1$ is only divided into two sections, only one hinge assembly 110 will be required. Each hinge assembly 110 is composed of two mating pairs of hinge members 112. Each hinge member 112 includes a face plate 113, a pair of upper mounting flanges 114, a pair of lower mounting flanges 115, a knuckle 116 and a guide 117. In the preferred embodiment, the mating pairs of hinge members 112 are mirror images of each other.

One hinge member 112 is mounted to the open end 101 of end section 38B. The upper mounting flanges 114 are secured to first layer 65B and the lower mounting flanges 115 are secured to second layer 66B using bolts, rivets or other well known means. Face plate 113 encloses open end 101 and forms plenum 67B. The mating hinge member 112 is mounted to the adjacent open end of middle section 38A by securing upper mounting flanges 114 to first layer 65A and lower mounting flanges 115 to second layer 66A. Face plate 113 encloses open ends 102 and 103.

When the two adjacent mating hinge mechanisms 112 are placed together, knuckles 116 and guides 117 are in alignment such that a clevis pin 118 may be inserted into each knuckle 116. In this manner, end section 38B may pivot upward from middle section 38A. A handle 119 may be secured to each side of middle section 38A and finger opening 120 may be provided on each end section 38B and/or 38C. In this manner, handle 119 may be used to place or remove deflector plate $38^1$ and finger opening 120 may be used to pivot one or both end sections 38B and/or 38C as desired. Alternatively, a handle 119 may be secured to end section 38B and/or 38C (not shown). Similarly, end section 38C is pivotably connected to the other side of middle section 38A using a pair of mating hinge mechanisms 112. One face plate 113 encloses the other open end 102 of middle section 38A and the face plate 113 of the mating hinge mechanism 112 enclosed open end 101 of end section 38C. Three substantially hollow plenums 67A, 67B and 67C are formed in each of the sections 38A, 38B and 3BC. In this manner, either or both end sections 38B and/or 38C may be pivoted upward to permit additional heat to pass around hinged deflector plate $38^1$. Alternatively, one or both sections 38B and/or 38C may be pivoted upward when it is desired to add additional fuel to the fuel grate 32 below. In the preferred embodiment, this is aided by finger opening 120. It will be understood by those of skill in the art that FIG. 16 is representative of a deflector plate $38^1$ having only two sections 38A and 38B.

As indicated, the preferred alternative hinged deflector or diffuser plate $38^1$ provides several advantages. For example, if deflector plate $38^1$ is in place prior to use of grill 20, one or both end sections 38B and/or 38C may be pivoted upward so that fuel may be placed on fuel grate 32 without removing the deflector plate $38^1$. Similarly, if additional fuel needs to be added during cooking, one or both end sections 38B and/or 38C may be pivoted upward and additional fuel added. Moreover, one or both end sections 38B and/or 38C may be pivoted upward during cooking to further control the temperature of the grill 20 by permitting increased air flow around deflector plate $38^1$.

It will be understood by those of skill in the art that other hinge assemblies 110 or other methods of connection may be used and that more or less deflector plate $38^1$ sections may be used. In addition, it will be understood that the open ends of the respective sections may be left open or may be constricted with a cover plate other than the face plate 113 of hinge member 113 as described herein.

A preferred embodiment of annular retaining member 36 may better be seen by reference to FIGS. 8A and 8B. As shown, it is formed from a plurality of circular members 70. The circular members 70 are attached to each other and stiffened by a plurality of cross members 71. The outer circumference of annular retaining member 36 coincides with the inner circumference of the intermediate portion 55 of interior body portion 51. In the preferred embodiment, annular retaining member 36 is supported by upper support tab 62. The interior circumference of annular retaining member 36 is sufficient to support deflector plate 38 or fuel grate 32, depending upon the type of cooking desired, as hereinafter described. It will be understood by those of skill in the art that annular retaining member 36 may take other forms. However, it is preferred that annular retaining member permit the passage of convection air between the deflector plate 38 and the interior surface of interior body member 51. In the preferred embodiments, the gap between the edge of deflector plate 38 and interior body member 51 is approximately one inch. This permits optimal air flow and temperature regulation and is particularly desirable for indirect cooking.

The present inventions also provide for a widely adjustable, vent assembly 80 as shown in FIGS. 9-12. Although the preferred vent assembly 80 is described in relation to use on the grills 20 of the present invention, it will be understood that it may be used with other grills. The preferred hinged vent assembly includes a vent collar 43 or similar means that fits within vent opening 48 of lid 22 (see FIGS. 3C, 6 and 7). Vent collar 43 is provided with an opposing pair of pivot brackets 81 having holes 86 to accommodate pivot pin 83. A lower, generally circular vent plate 84 is also provided.

Lower vent plate 84 includes a plurality of vent holes 85. The preferred lower vent plate 84 has four vent holes 85, but it will be understood that more or less vent holes 85 may also be used. A central hole 87 is also provided on lower plate 84 to function as hereinafter described.

Lower vent plate 84 is provided with downwardly extending, opposing pivot tabs 79 having holes 82 to accommodate pivot pin 83. Pivot tabs 79 are sized and spaced to mate with pivot brackets 81 such that holes 82 and 86 align to accommodate pivot pin 81. In this manner, lower plate 84 is pivotably mounted to vent collar 43 so that it may be rotated upward from vent collar 43 as shown, for example, in FIG. 11.

A generally circular upper plate 88 is also provided. Upper plate 88 includes a plurality of vent holes 89, which in the preferred embodiment coincides in number, shape and placement to vent holes 85 of lower plate 84. A central hole 90 is also provided. Upper plate 88 may also include an upstanding tab 91 upon which a handle 92 may be secured.

Figure 12:
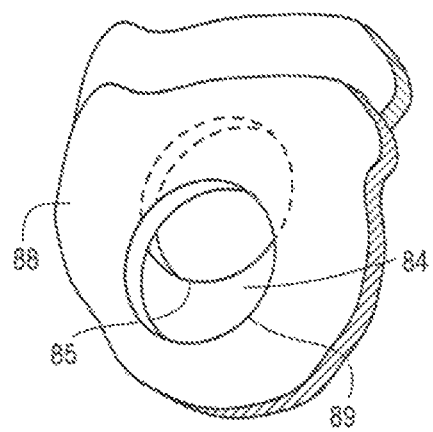
FIG. 12 is a detailed view of one potential alignment of upper and lower vent holes on the upper and lower vent plates of the preferred adjustable vent assembly taken from inset 12 of FIG. 11.
Figure 11:
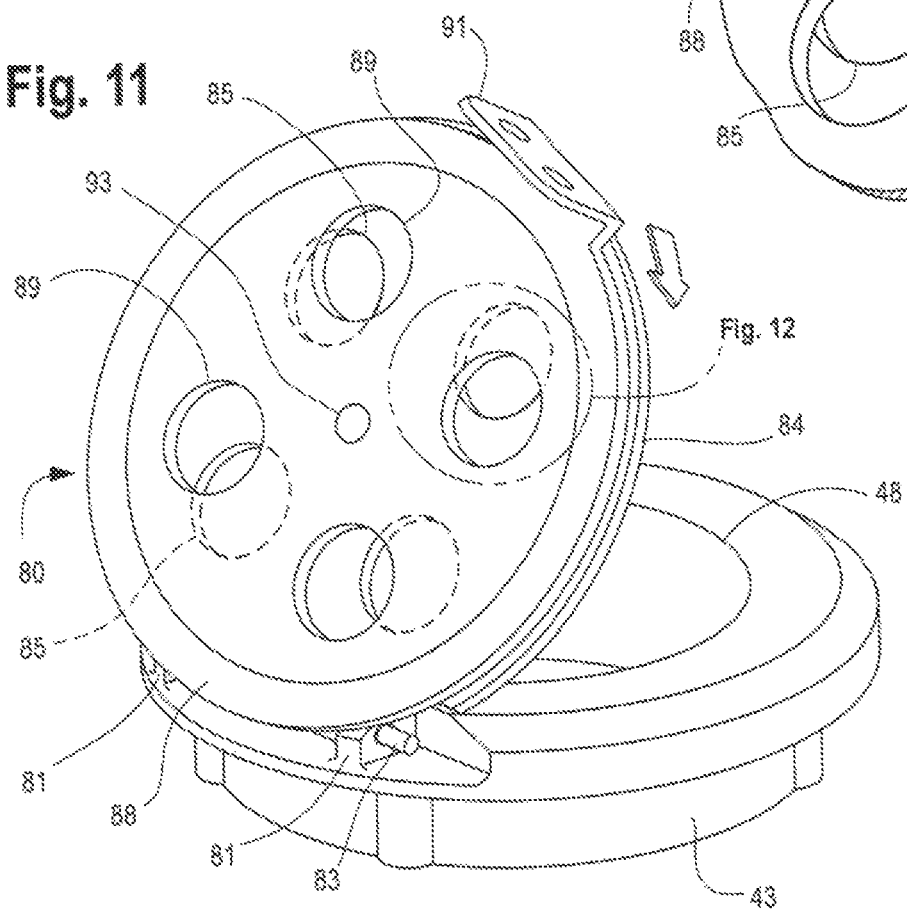
FIG. 11 is a perspective view of the preferred vent assembly of FIG. 10 shown in an open position and showing a potential alignment of the vent holes on the upper and lower vent plates.
Figure 13:
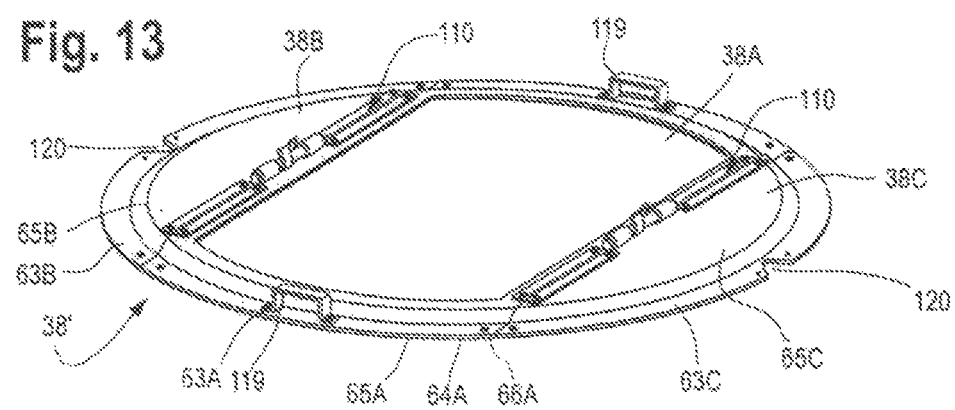
FIG. 13 is a perspective view of a preferred embodiment of a hinged deflector or diffuser plate of the present invention.

Upper plate 88 is rotatably secured to lower plate 84 by a rivet 93 through central holes 87 and 90, although other means of rotatably mounting will be understood by those of skill in the art. As a result, the size of the vent opening may be adjusted as shown in FIG. 12. For example, when vent holes 89 of upper plate 88 are fully aligned with vent holes 85 of lower plate 84, the maximum amount of air through the vent holes 85 and 89 is permitted. As upper plate 88 is rotated, the opening between the vent holes 85 and 89 is restricted. Upon further rotation, the opening between the vent holes 85 and 89 may be fully closed. To provide maximum ventilation, the upper 88 and lower 84 plates may be pivoted upward along pivot pin 83 so that the entire vent opening 48 of vent collar 43 is available for ventilation. Accordingly, ventilation may be adjusted from a fully closed to a fully open condition that provides maximum control over cooking temperature, particularly, but not limited to, when it is combined with bottom damper 30 of the present inventions. It will be understood by those of skill in the art that vent assembly 80 may be used with the grills 20 of the present inventions or any other grills having lids and vents. It will also be understood that there are a variety of ways to pivotably connect lower plate 84 or upper plate 88 to vent collar 43. It will further be understood that vent holes 85 and 89 may take a variety of shapes and there may be more or less than four such holes 85 and 89.

Having described the principal components of a preferred embodiment of the grill 20 of the present inventions, the preferred operation will be described. The preferred configuration for indirect cooking is shown in FIG. 7. In this mode, fuel grate 32 is supported by lower support tabs 61 toward the bottom of grill body 24 and within interior body member 51. Annular retaining member 36 is supported by upper support tabs 62. Annular retaining member 36 in turn supports deflector plate 38. In this manner, a heat deflecting barrier is interposed between the heat source on the fuel grate 32 and the cooking grid 34. The majority of the heat flows upward around the edge of deflector plate 38 and inner body member 51. In this manner, convection cooking is enhanced. And, because of the air insulated lid 22 and partially doable layered body 24, fuel is conserved.

During slow cooking, the dampers 30 are preferably set so that only the key shaped protrusions 29 (or portions thereof) of air intake slots 28 are open. Combustion air enters the bottom of grill body 24, is heated by the fuel on fuel grate 32, is deflected by deflector plate 38 and up through the gap between inner body member 51 and the edge of deflector plate 38, and exits through the lid vent 26 in the top center of lid 22. This creates uniform fuel combustion, which in turn creates uniform air flow. It also maximizes fuel efficiency and results in a higher percentage of fuel utilization. When preferred adjustable vent assembly 80 is used, maximum adjustability may be achieved.

When direct cooking is desired, the grill 20 is configured as best shown in FIG. 6. In this situation, no deflector plate 38 is used. Instead, fuel grate 32 is supported by annular retaining member 36. Typically, dampers 30 would be set to expose more of air intake slots 28 and allow more combustion air into the grill body 24, as desired for optimal direct cooking. In the preferred embodiment, it is not necessary to remove annular retaining member 36 when changing between direct and indirect cooking, since annular retaining member 36 supports both the fuel grate 32 and the deflector plate 38. The heat source from fuel grate 32 is closer to cooking grid 34 and there is no heat deflecting barrier between the two. In this manner, among others that will be understood by those of skill in the art, the flexibility inherent in the present inventions permits optimal direct and indirect cooking. In addition, the preferred deflector plates 38 and 38$^1$ do not act as a major heat source that also optimizes slow cooking. And, the double walled lid 22 and partially double walled grill body 24 provide insulation and retain heat for optimal cooking and reduced fuel consumption.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A hinged deflector plate for use in a grill, the grill having an annular retaining member, a cooking grate and a fuel grate, the hinged deflector plate comprising:

a middle section, the middle section having a generally flat first layer and a generally flat second layer, the second layer attached to the first layer and a substantially enclosed and hollow plenum formed between the first and second layers;

two end sections, each end section having a generally flat first laser and a generally flat second layer, the second layer attached to the first layer and a substantially enclosed and hollow plenum formed between the first and second layers;

a first hinge assembly connecting one end section to the middle section;

a second hinge assembly connecting the other end section to the middle section;

wherein the hinged deflector plate is supported on the annular retaining member between the fuel grate and the cooking grate of the grill to form a heat barrier therebetween;

wherein the hinge assembly is composed of two mating pairs of hinge members having a face plate, a pair of upper flanges, a pair of lower mounting flanges, a knuckle and a guide; and, wherein one or both end sections may be rotated upward about said hinge assemblies, thereby removing a portion of the heat barrier of said hinged deflector plate.

2. The hinged deflector plate of claim 1 wherein the hinged deflector plate is generally circular when the end sections are attached to the middle section.

3. The deflector plate of claim 2 wherein the first and second layers of the sections are constructed of porcelain covered steel.

4. The deflector plate of claim 1 wherein the plenum between the first and second layers of each of the sections is approximately one half inch throughout substantially all of each of said layers.

* * * * *